(12) United States Patent
Johnson et al.

(10) Patent No.: US 11,890,979 B2
(45) Date of Patent: Feb. 6, 2024

(54) HEADREST

(71) Applicant: TS TECH CO., LTD., Asaka (JP)

(72) Inventors: Steven Johnson, Newark, OH (US);
Jacob Williams, Blacklick, OH (US);
James Denlinger, Columbus, OH (US);
Dinesh Hadadare, Columbus, OH (US); Adam Greening, Reynoldsburg, OH (US); Chase Hemmelgarn, Columbus, OH (US); Peter Schupska, Columbus, OH (US); Ryan Buffington, Hebron, OH (US); Jason Christopher, Reynoldsburg, OH (US); David Saintignon, Columbus, OH (US)

(73) Assignee: TS TECH CO., LTD., Asaka (JP)

( * ) Notice: Subject to any disclaimer, the term of this patent is extended or adjusted under 35 U.S.C. 154(b) by 63 days.

(21) Appl. No.: 17/761,922

(22) PCT Filed: Sep. 7, 2020

(86) PCT No.: PCT/JP2020/033829
§ 371 (c)(1),
(2) Date: Mar. 18, 2022

(87) PCT Pub. No.: WO2021/054184
PCT Pub. Date: Mar. 25, 2021

(65) Prior Publication Data
US 2022/0348123 A1 Nov. 3, 2022

Related U.S. Application Data

(60) Provisional application No. 62/942,431, filed on Dec. 2, 2019, provisional application No. 62/914,834, filed (Continued)

(51) Int. Cl.
*B60N 2/80* (2018.01)
*B60N 2/809* (2018.01)
(Continued)

(52) U.S. Cl.
CPC ............. *B60N 2/809* (2018.02); *B60N 2/838* (2018.02); *B60N 2/891* (2018.02); *B60N 2/80* (2018.02);
(Continued)

(58) Field of Classification Search
CPC . B60N 2/80; B60N 2/85; B60N 2/856; B60N 2/832; B60N 2/809; B60N 2/891
See application file for complete search history.

(56) References Cited

U.S. PATENT DOCUMENTS

| 4,991,907 A | * | 2/1991 | Tanaka ..................... B60N 2/85 |
| | | | 297/404 |
| 5,765,918 A | | 6/1998 | Wakamatsu et al. |

(Continued)

FOREIGN PATENT DOCUMENTS

| JP | H0645552 | 6/1994 |
| JP | H09149837 | 6/1997 |

(Continued)

OTHER PUBLICATIONS

PCT International Search Report (w/ English translation) for corresponding Application No. PCT/JP2020/033829, dated Oct. 20, 2020, 5 pages.

*Primary Examiner* — Syed A Islam
(74) *Attorney, Agent, or Firm* — Dority & Manning, PA

(57) ABSTRACT

The load applied to a connecting member that connects a second horizontal shaft to a base member in a headrest for a vehicle is reduced. The headrest comprises a pillar member including a right and a left vertical shaft extending upward from an upper part of a seat back, a right and a left first horizontal shaft extending forward from upper ends of the respective vertical shafts, each first horizontal shaft including a curved section, and a second horizontal shaft extending laterally between front parts of the first horizontal shafts, a base member including a base vertical portion extending (Continued)

Figure 1:
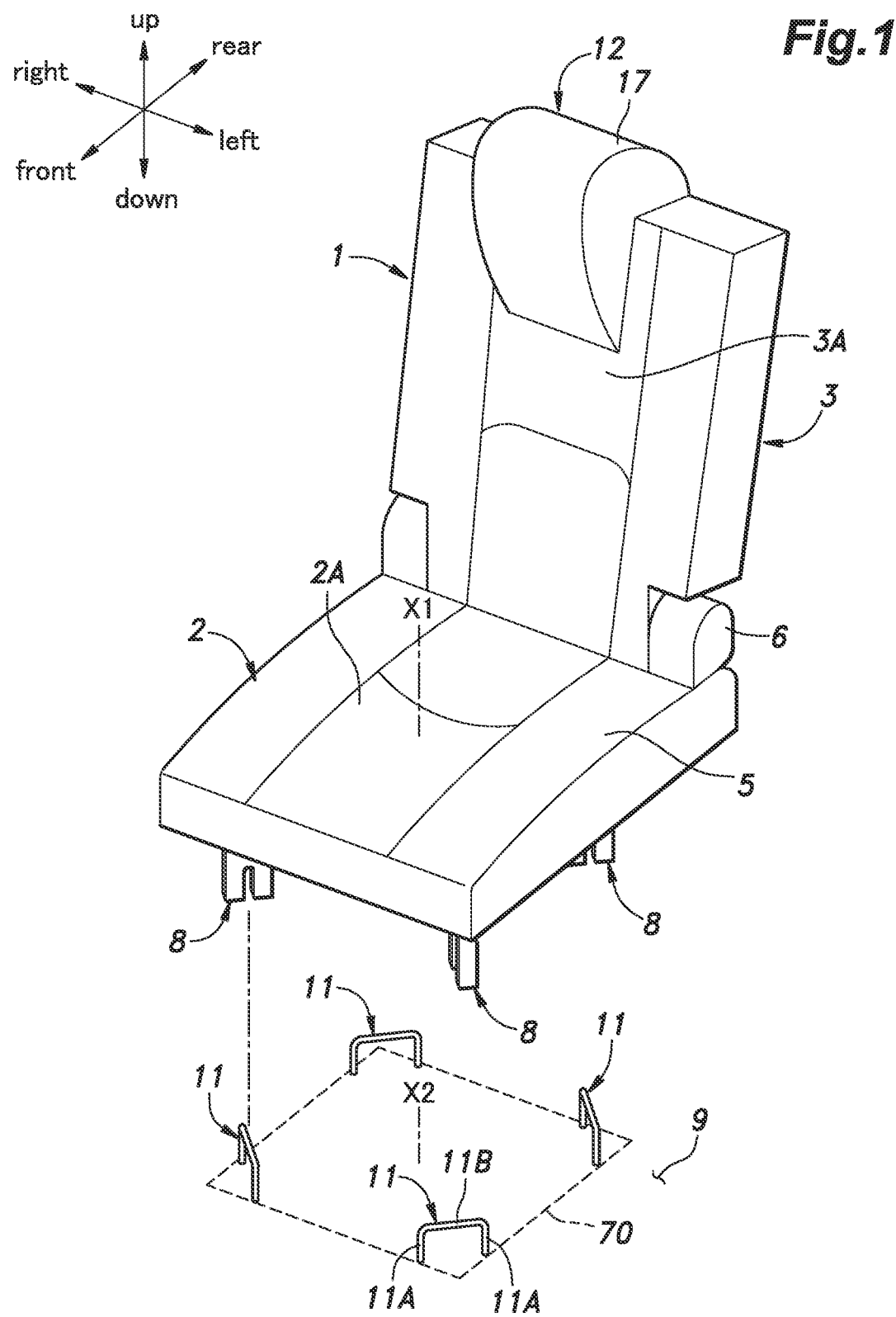

vertically ahead of the vertical shafts, a base upper portion extending rearward from an upper end of the base vertical portion, and a right and a left first hole formed in the base upper portion to have the respective curved sections or the respective vertical shafts passed therethrough, a connecting member pivotably connecting the base upper portion to the second horizontal shaft, and a pad supported by the base member.

19 Claims, 23 Drawing Sheets

Related U.S. Application Data on Oct. 14, 2019, provisional application No. 62/914,841, filed on Oct. 14, 2019, provisional application No. 62/903,418, filed on Sep. 20, 2019.

(51) Int. Cl.
*B60N 2/838* (2018.01)
*B60N 2/891* (2018.01)
*B60N 2/832* (2018.01)
*B60N 2/85* (2018.01)
*B60N 2/856* (2018.01)

(52) U.S. Cl.
CPC ............ *B60N 2/832* (2018.02); *B60N 2/85* (2018.02); *B60N 2/856* (2018.02)

(56) References Cited

U.S. PATENT DOCUMENTS

| | | | | |
|---|---|---|---|---|
| 6,499,805 | B1* | 12/2002 | Watadani | B60N 2/85 297/391 |
| 8,322,790 | B2* | 12/2012 | Tscherbner | B60N 2/832 297/410 |
| 8,851,562 | B2* | 10/2014 | Rezbarik | B60N 2/809 297/378.12 |
| 8,939,513 | B2* | 1/2015 | Holmes | B60N 2/874 297/410 |
| 8,991,927 | B2* | 3/2015 | Wisniewski | B60N 2/809 297/391 |
| 9,463,724 | B2* | 10/2016 | Sunaga | B60N 2/58 |
| 9,511,696 | B2* | 12/2016 | Wang | B60N 2/859 |
| 9,616,788 | B2* | 4/2017 | Tabata | A47C 7/38 |
| 9,731,637 | B2* | 8/2017 | Humer | B60N 2/838 |
| 2012/0261967 | A1* | 10/2012 | Ahlbrand | B60N 2/809 297/391 |
| 2013/0285431 | A1* | 10/2013 | Turletti | B60N 2/865 297/391 |

FOREIGN PATENT DOCUMENTS

| | | |
|---|---|---|
| JP | 2005-287967 | 10/2005 |
| JP | 2018-086873 | 6/2018 |

\* cited by examiner

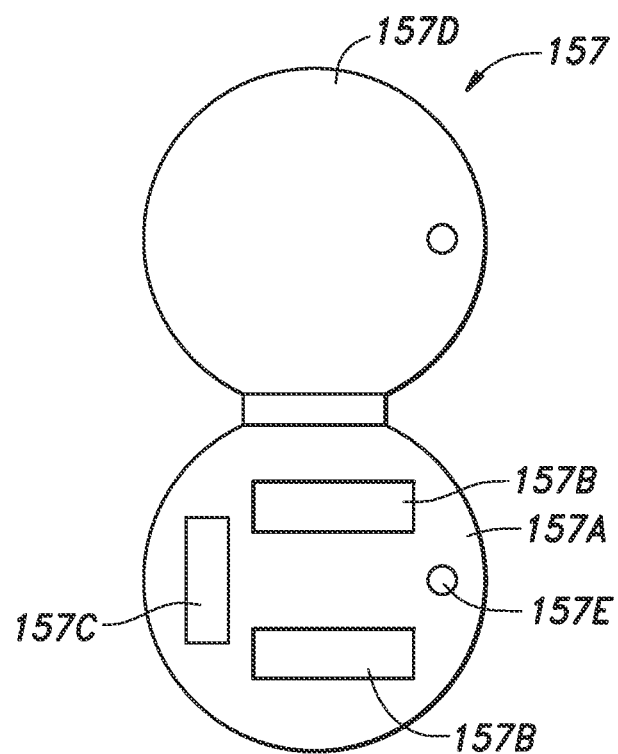

HEADREST

CROSS REFERENCE TO RELATED APPLICATIONS

This application is the U.S. National Stage entry of International Application No. PCT/JP2020/033829 filed under the Patent Cooperation Treaty on Sep. 7, 2020, which claims priority to U.S. Provisional Patent Application No. 62/903,418 filed on Sep. 20, 2019, U.S. Provisional Patent Application No. 62/914,834 filed on Oct. 14, 2019, U.S. Provisional Patent Application No. 62/914,841 filed on Oct. 14, 2019, and U.S. Provisional Patent Application No. 62/942,431 filed on Dec. 2, 2019, all of which are incorporated herein by reference.

TECHNICAL FIELD

The present invention relates to a headrest for a vehicle seat.

BACKGROUND ART

Patent Document 1 discloses a headrest for a vehicle seat having a pillar member and a base member pivotably supported by the pillar member. The pillar member includes a right and a left leg extending upward from the upper end of the seat back, and a second horizontal shaft extending laterally and linearly and connected to the upper ends of the left and right legs. A hinge clip is pivotably attached to the second horizontal shaft, and is fastened to the base member.

PRIOR ART DOCUMENT(S)

Patent Document(s)

Patent Document 1: U.S. Pat. No. 8,322,790B2

SUMMARY OF THE INVENTION

Task to be Accomplished by the Invention

In the headrest disclosed in Patent Document 1, the second horizontal shaft is positioned in a rear part of the headrest so that a frontal load applied to the base member is transmitted to the pillar member via a connecting member. Therefore, a significant load is applied to the connecting member, and the connecting member may be deformed as a result.

In view of the above background, it is an object of the present invention to reduce the load applied to the connecting member that connects the second horizontal shaft to the base member in the headrest.

Means to Accomplish the Task

According to an aspect of the present invention, such an object can be accomplished by providing a headrest (12) for a vehicle seat (1), comprising: a pillar member (13) including a right and a left vertical shaft (13A) extending upward from an upper part of a seat back (3), a right and a left first horizontal shaft (13C) extending forward from upper ends of the respective vertical shafts, each first horizontal shaft including a curved section (13B), and a second horizontal shaft (13D) extending laterally between front parts of the first horizontal shafts; a base member (14) including a base vertical portion (14A) extending vertically ahead of the vertical shafts, a base upper portion (14B) extending rearward from an upper end of the base vertical portion, and a right and a left first hole (21) formed in the base upper portion to have the respective curved sections or the respective vertical shafts passed therethrough; a connecting member (15) pivotably connecting the base upper portion to the second horizontal shaft; and a pad (16) supported by the base member.

Since the second horizontal shafts are positioned in front of the vertical shafts owing to the presence of the first horizontal shafts, the pillar member can directly receive a frontal load without involving the base member and the connecting member. As a result, the load applied to the connecting member that connects the second horizontal shaft to the base member in the headrest can be reduced.

Preferably, in this configuration, the connecting member includes a channel shaped engaging portion (15A) pivotably receiving the second horizontal shaft, and a first fastening portion (15B) extending from a side edge of the engaging portion and fastened to the base upper portion via a fastening member (22) and positioned behind the second horizontal shaft.

Thereby, the connecting member and the fastening member are prevented from abutting against the occupant's head via the pad.

Preferably, in this configuration, the engaging portion has a semicircular cross section which is open rearward.

Thereby, when a frontal load is applied to the base member, the engaging portion can be kept engaged by the second horizontal shaft so that the engaging portion is prevented from dislodging from or moving relative to the second horizontal shaft.

Preferably, in this configuration, the connecting member is provided with a second fastening portion (15C) extending from another side edge of the engaging portion, a part of the base member located at a boundary between the base upper portion and the base vertical portion is provided with a base hole (24) which is passed through the base member, the second horizontal shaft is located at a boundary between the base upper portion and the base vertical portion, the first fastening portion is located on an upper surface of the base upper portion, the second fastening portion is passed through the base hole and positioned on a lower surface of the base upper portion, and the fastening member includes a bolt (22A) passed through the first fastening portion, the base upper portion and the second fastening portion, and a nut (22B) threadably engaging the bolt.

Thereby, the connecting structure between the connecting member and the base upper portion can be simplified.

Preferably, in this configuration, the nut is welded to the second fastening portion.

Thereby, the fastening work of the connecting member to the upper base part of the base by the bolt can be facilitated.

Preferably, in this configuration, the engaging portion protrudes from a head of the bolt in an axial direction of the bolt.

Thereby, the head of the bolt is prevented from abutting against the head of the occupant via the pad.

Preferably, in this configuration, the pad is in contact with the first fastening portion between the engaging portion and the head of the bolt.

Thereby, the gap between the pad and the first fastening portion can be reduced so that the deformation of the pad due to the gap can be minimized.

Preferably, in this configuration, an upper part of the base vertical portion is provided with a first bulging portion (26) bulging more away from the base upper portion than the second horizontal shaft.

Thereby, the rigidity of the base vertical portion can be improved.

Preferably, in this configuration, a part of the first bulging portion on a side of the second horizontal shaft is formed with a recess (26A) receiving a part of the connecting member.

Thereby, a part of the connecting member can be placed in the recess so that the second horizontal shaft and the first bulging portion can be positioned close to each other.

Preferably, in this configuration, the first bulging portion is positioned between the left and right vertical shafts in front view.

Thereby, the first bulging portion can improve the rigidity of the laterally central part of the base vertical portion.

Preferably, in this configuration, the base vertical portion is provided with at least one second bulging portion (27) that bulges forward and extends downward from the first bulging portion. Further, preferably, the base vertical portion is provided with a third bulging portion (28) that bulges forward and extends along an edge of the base vertical portion, and the second bulging portion and the third bulging portion are connected to each other.

Thereby, the rigidity of the base vertical portion can be improved by the second bulging portion and the third bulging portion.

Preferably, in this configuration, a plurality of reinforcing ribs (29) extending in a direction orthogonal to a lengthwise direction are provided on rear surfaces of the second bulging portion and the third bulging portion.

Thereby, the rigidity of the second bulging portion and the third bulging portion can be improved.

Preferably, in this configuration, the base upper portion is provided with a right and a left groove (31) which are recessed downward and extend in a fore and aft direction, the first holes being formed at rear end parts of the respective grooves.

Thereby, the first horizontal shafts can be positioned in the corresponding grooves so that the upward protrusion of the first horizontal shafts with respect to the base upper part can be minimized.

Preferably, in this configuration, the first holes each consist of an elongated hole extending in a fore and aft direction, and at least one of a front end and a rear end of the first hole is formed in a substantially triangular shape.

Thereby, when the base member pivots relative to the pillar member and the leg portions abut against the front ends or the rear ends of the first holes, the movement of the base member in the lateral direction with respect to the pillar member is restricted so that the rattling of the base member can be prevented.

Preferably, in this configuration, the pillar member (41) includes a third shaft (41E) that extends laterally ahead of the second horizontal shaft (41D) and is connected to front ends of the first horizontal shafts (41C).

Thereby, the frontal load can be received by the third horizontal shaft so that the load applied to the connecting member can be reduced.

Preferably, in this configuration, a front end of the first horizontal shafts or the third horizontal shaft abuts against a front surface of the base vertical portion so as to restrict an angular position of the base member with respect to the second horizontal shaft.

Thereby, the load for restricting the rotation of the base member with respect to the second horizontal shaft can be received by the front surface of the base vertical portion, and damage to the base member can be minimized.

Preferably, in this configuration, the second horizontal shaft is interposed between the connecting member (43) and the base member.

Thereby, a frictional force can be applied to the second horizontal shaft by the connecting member and the base member so that the angular position of the second horizontal shaft with respect to the base member can be maintained.

Effect of the Invention

A certain aspect of the present invention provides a headrest (12) for a vehicle seat (1), comprising: a pillar member (13) including a right and a left vertical shaft (13A) extending upward from an upper part of a seat back (3), a right and a left first horizontal shaft (13C) extending forward from upper ends of the respective vertical shafts, each first horizontal shaft including a curved section (13B), and a second horizontal shaft (13D) extending laterally between front parts of the first horizontal shafts; a base member (14) including a base vertical portion (14A) extending vertically ahead of the vertical shafts, a base upper portion (14B) extending rearward from an upper end of the base vertical portion, and a right and a left first hole (21) formed in the base upper portion to have the respective curved sections or the respective vertical shafts passed therethrough; a connecting member (15) pivotably connecting the base upper portion to the second horizontal shaft; and a pad (16) supported by the base member. Since the second horizontal shafts are positioned in front of the vertical shafts owing to the presence of the first horizontal shafts, the pillar member can directly receive a frontal load without involving the base member and the connecting member. As a result, the load applied to the connecting member that connects the second horizontal shaft to the base member in the headrest can be reduced.

Preferably, in this configuration, the connecting member includes a channel shaped engaging portion (15A) pivotably receiving the second horizontal shaft, and a first fastening portion (15B) extending from a side edge of the engaging portion and fastened to the base upper portion via a fastening member (22) and positioned behind the second horizontal shaft. Thereby, the connecting member and the fastening member are prevented from abutting against the occupants head via the pad.

Preferably, in this configuration, the engaging portion has a semicircular cross section which is open rearward. Thereby, when a frontal load is applied to the base member, the engaging portion can be kept engaged by the second horizontal shaft so that the engaging portion is prevented from dislodging from or moving relative to the second horizontal shaft.

Preferably, in this configuration, the connecting member is provided with a second fastening portion (15C) extending from another side edge of the engaging portion, a part of the base member located at a boundary between the base upper portion and the base vertical portion is provided with a base hole (24) which is passed through the base member, the second horizontal shaft is located at a boundary between the base upper portion and the base vertical portion, the first fastening portion is located on an upper surface of the base upper portion, the second fastening portion is passed through the base hole and positioned on a lower surface of the base upper portion, and the fastening member includes a bolt (22A) passed through the first fastening portion, the base upper portion and the second fastening portion, and a nut (22B) threadably engaging the bolt. Thereby, the connecting structure between the connecting member and the base upper portion can be simplified.

Preferably, in this configuration, the nut is welded to the second fastening portion. Thereby, the fastening work of the connecting member to the upper base part of the base by the bolt can be facilitated.

Preferably, in this configuration, the engaging portion protrudes from a head of the bolt in an axial direction of the bolt. Thereby, the head of the bolt is prevented from abutting against the head of the occupant via the pad.

Preferably, in this configuration, the pad is in contact with the first fastening portion between the engaging portion and the head of the bolt. Thereby, the gap between the pad and the first fastening portion can be reduced so that the deformation of the pad due to the gap can be minimized.

Preferably, in this configuration, an upper part of the base vertical portion is provided with a first bulging portion (26) bulging more away from the base upper portion than the second horizontal shaft. Thereby, the rigidity of the base vertical portion can be improved.

Preferably, in this configuration, a part of the first bulging portion on a side of the second horizontal shaft is formed with a recess (26A) receiving a part of the connecting member. Thereby, a part of the connecting member can be placed in the recess so that the second horizontal shaft and the first bulging portion can be positioned close to each other.

Preferably, in this configuration, the first bulging portion is positioned between the left and right vertical shafts in front view. Thereby, the first bulging portion can improve the rigidity of the laterally central part of the base vertical portion.

Preferably, in this configuration, the base vertical portion is provided with at least one second bulging portion (27) that bulges forward and extends downward from the first bulging portion. Further, preferably, the base vertical portion is provided with a third bulging portion (28) that bulges forward and extends along an edge of the base vertical portion, and the second bulging portion and the third bulging portion are connected to each other. Thereby, the rigidity of the base vertical portion can be improved by the second bulging portion and the third bulging portion.

Preferably, in this configuration, a plurality of reinforcing ribs (29) extending in a direction orthogonal to a lengthwise direction are provided on rear surfaces of the second bulging portion and the third bulging portion. Thereby, the rigidity of the second bulging portion and the third bulging portion can be improved.

Preferably, in this configuration, the base upper portion is provided with a right and a left groove (31) which are recessed downward and extend in a fore and aft direction, the first holes being formed at rear end parts of the respective grooves. Thereby, the first horizontal shafts can be positioned in the corresponding grooves so that the upward protrusion of the first horizontal shafts with respect to the base upper part can be minimized.

Preferably, in this configuration, the first holes each consist of an elongated hole extending in a fore and aft direction, and at least one of a front end and a rear end of the first hole is formed in a substantially triangular shape. Thereby, when the base member pivots relative to the pillar member and the leg portions abut against the front ends or the rear ends of the first holes, the movement of the base member in the lateral direction with respect to the pillar member is restricted so that the rattling of the base member can be prevented.

Preferably, in this configuration, the pillar member (41) includes a third shaft (41E) that extends laterally ahead of the second horizontal shaft (41D) and is connected to front ends of the first horizontal shafts (41C). Thereby, the frontal load can be received by the third horizontal shaft so that the load applied to the connecting member can be reduced.

Preferably, in this configuration, a front end of the first horizontal shafts or the third horizontal shaft abuts against a front surface of the base vertical portion so as to restrict an angular position of the base member with respect to the second horizontal shaft. Thereby, the load for restricting the rotation of the base member with respect to the second horizontal shaft can be received by the front surface of the base vertical portion, and damage to the base member can be minimized.

Preferably, in this configuration, in this configuration, the second horizontal shaft is interposed between the connecting member (43) and the base member. Thereby, a frictional force can be applied to the second horizontal shaft by the connecting member and the base member so that the angular position of the second horizontal shaft with respect to the base member can be maintained.

BRIEF DESCRIPTION OF THE DRAWING(S)

Figure 2:
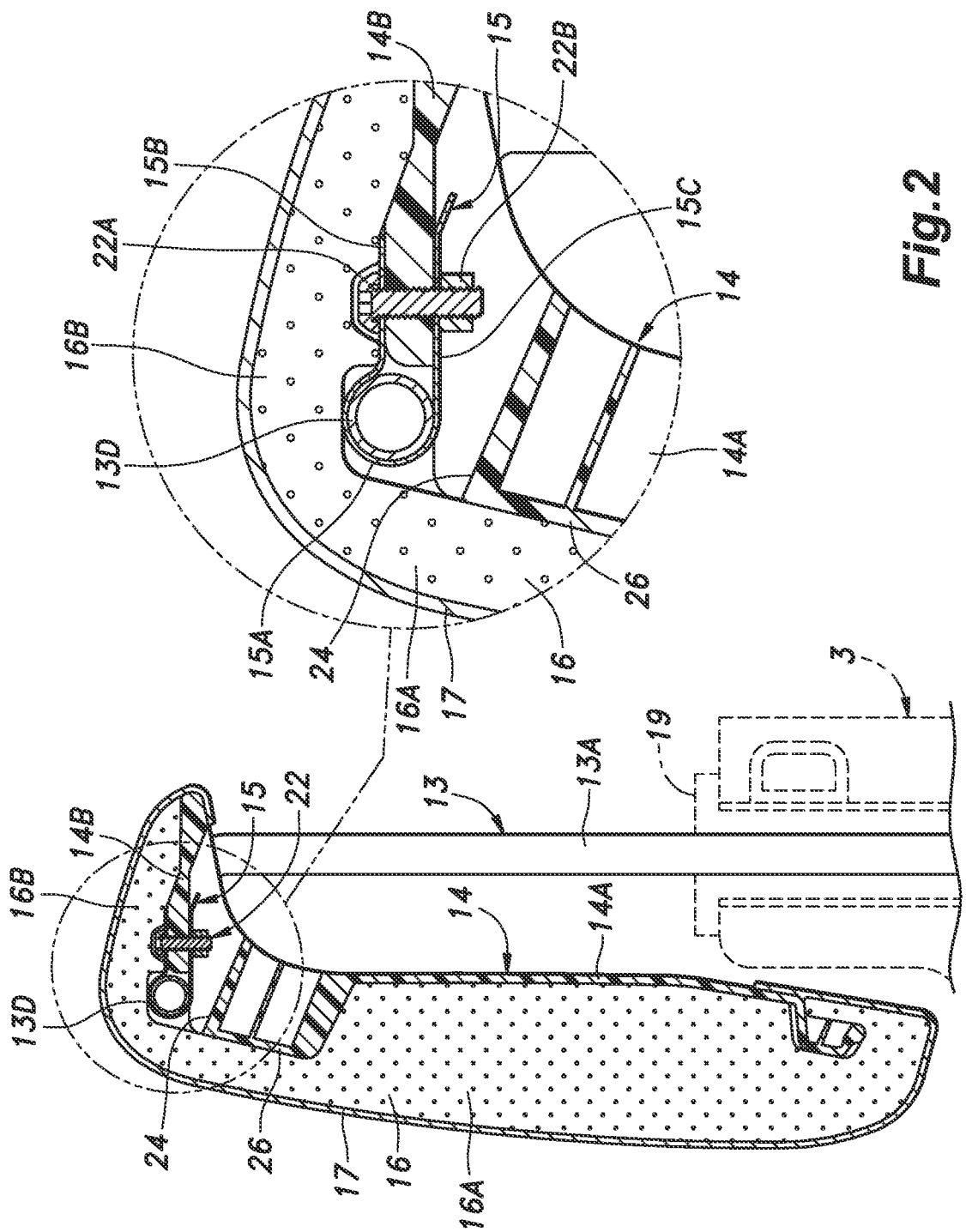
Figure 3:
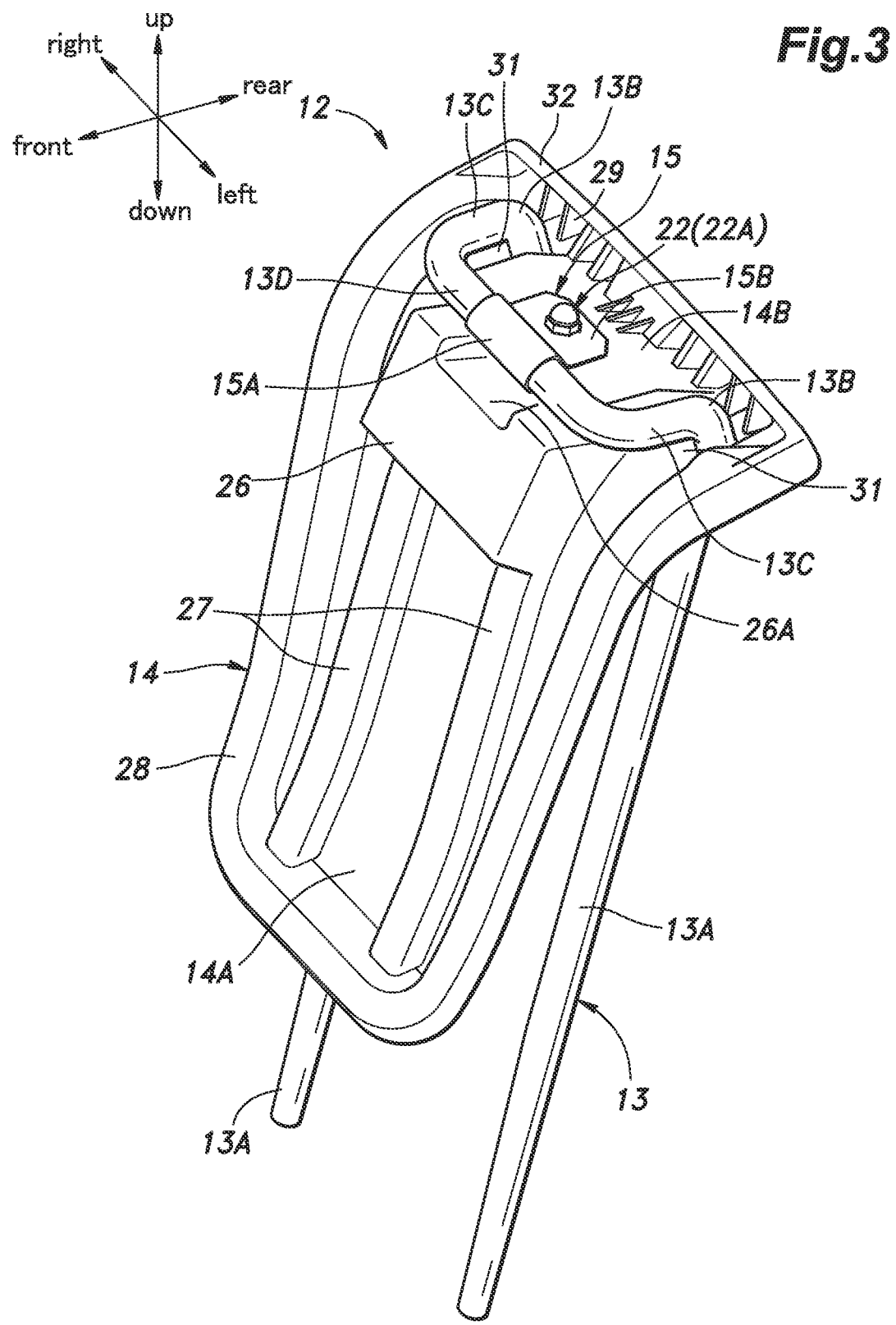
Figure 4:
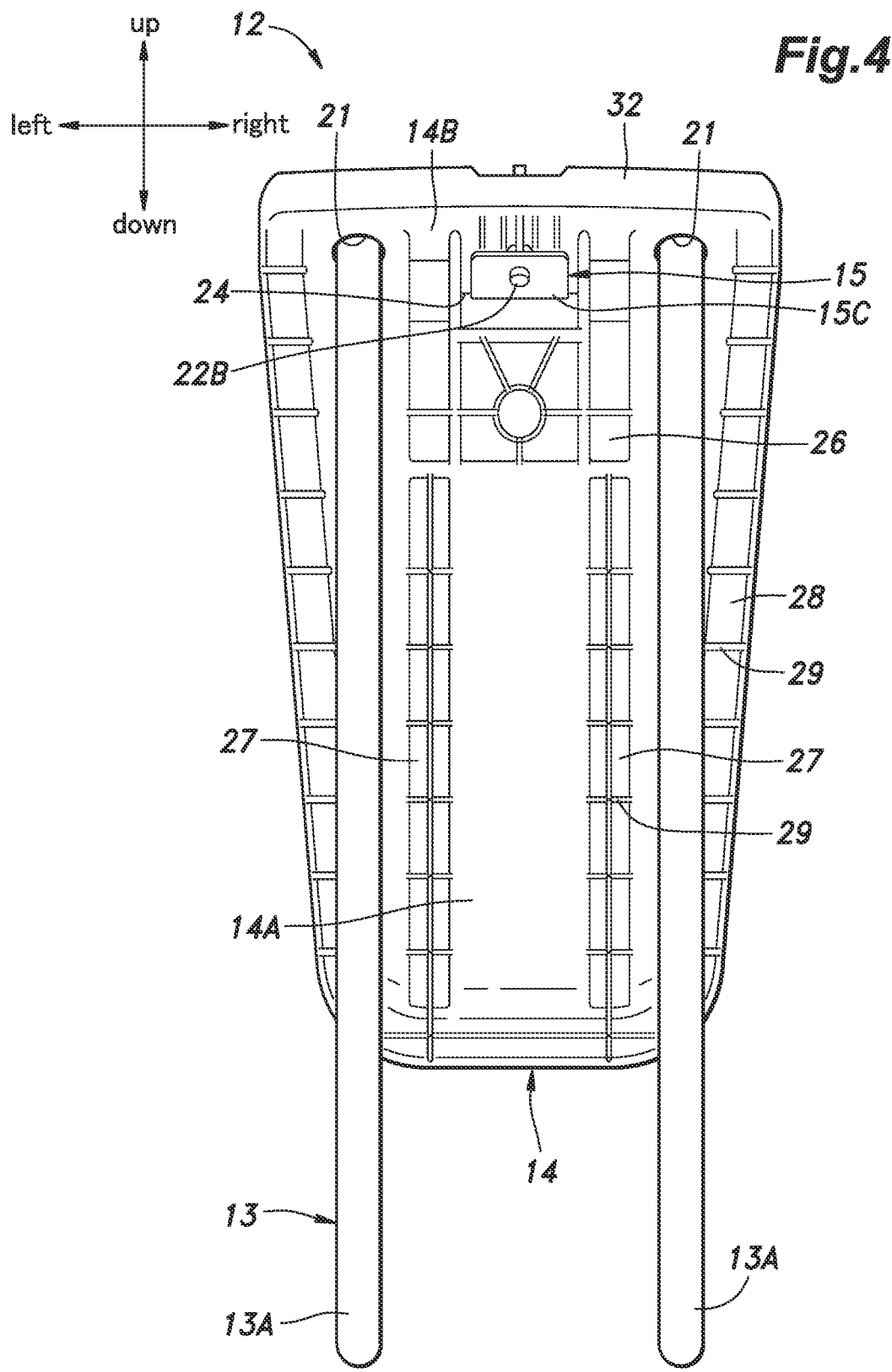
Figure 5:
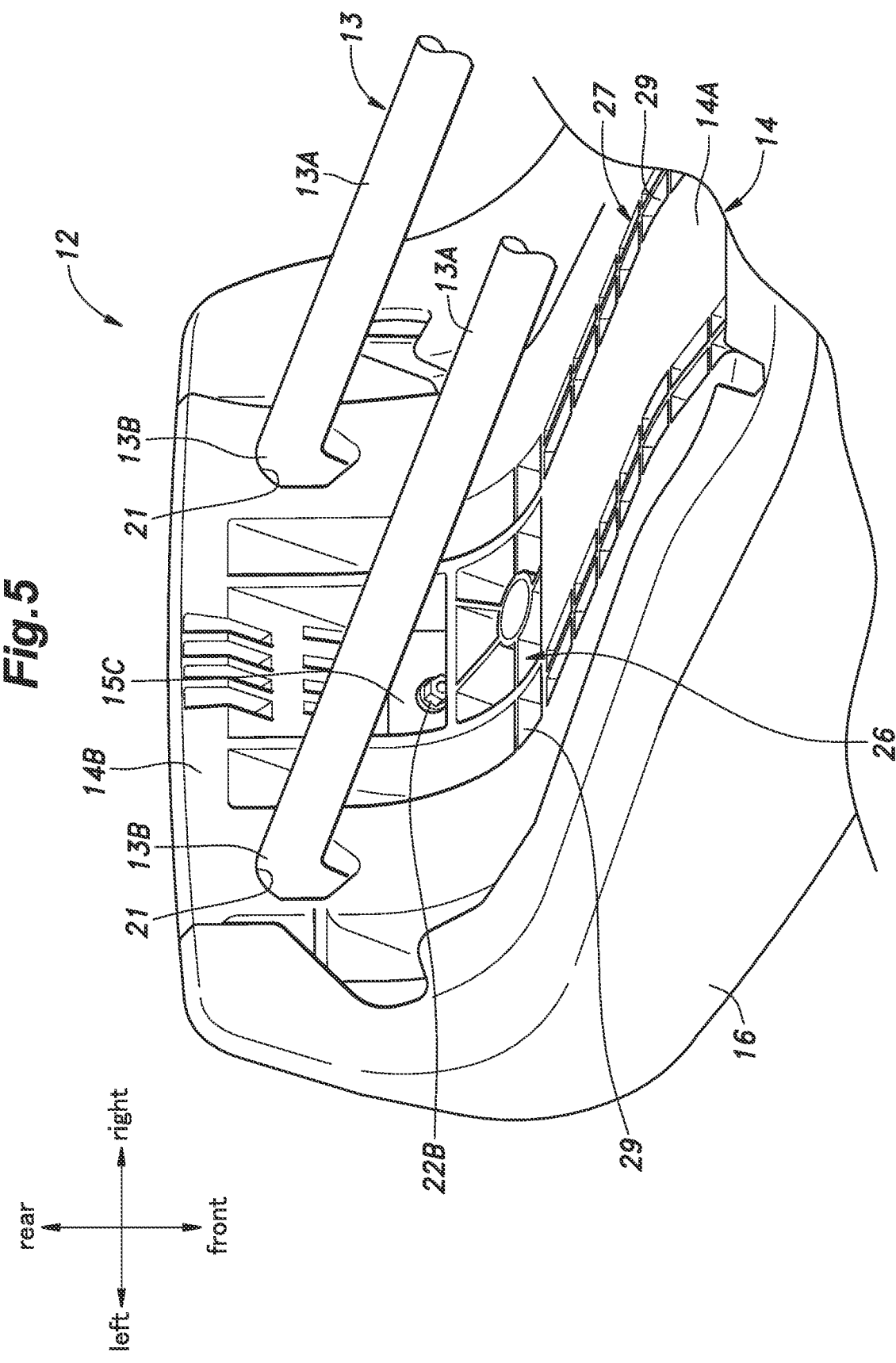
Figure 6:
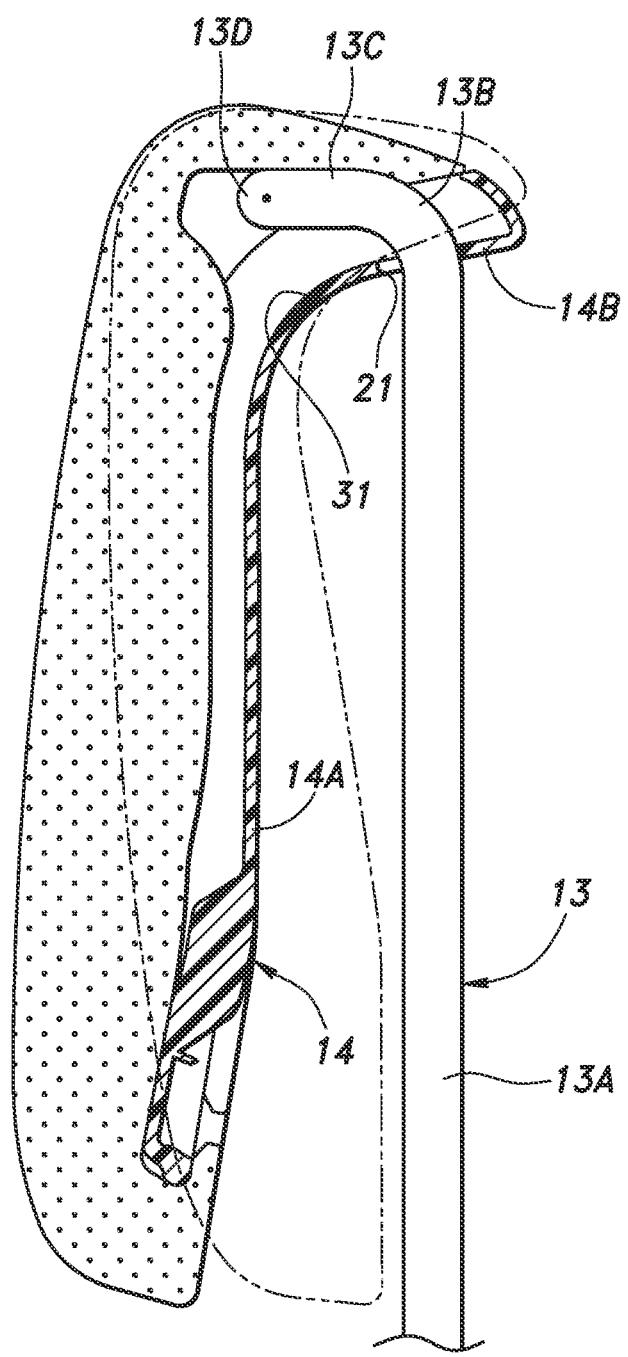
Figure 7:
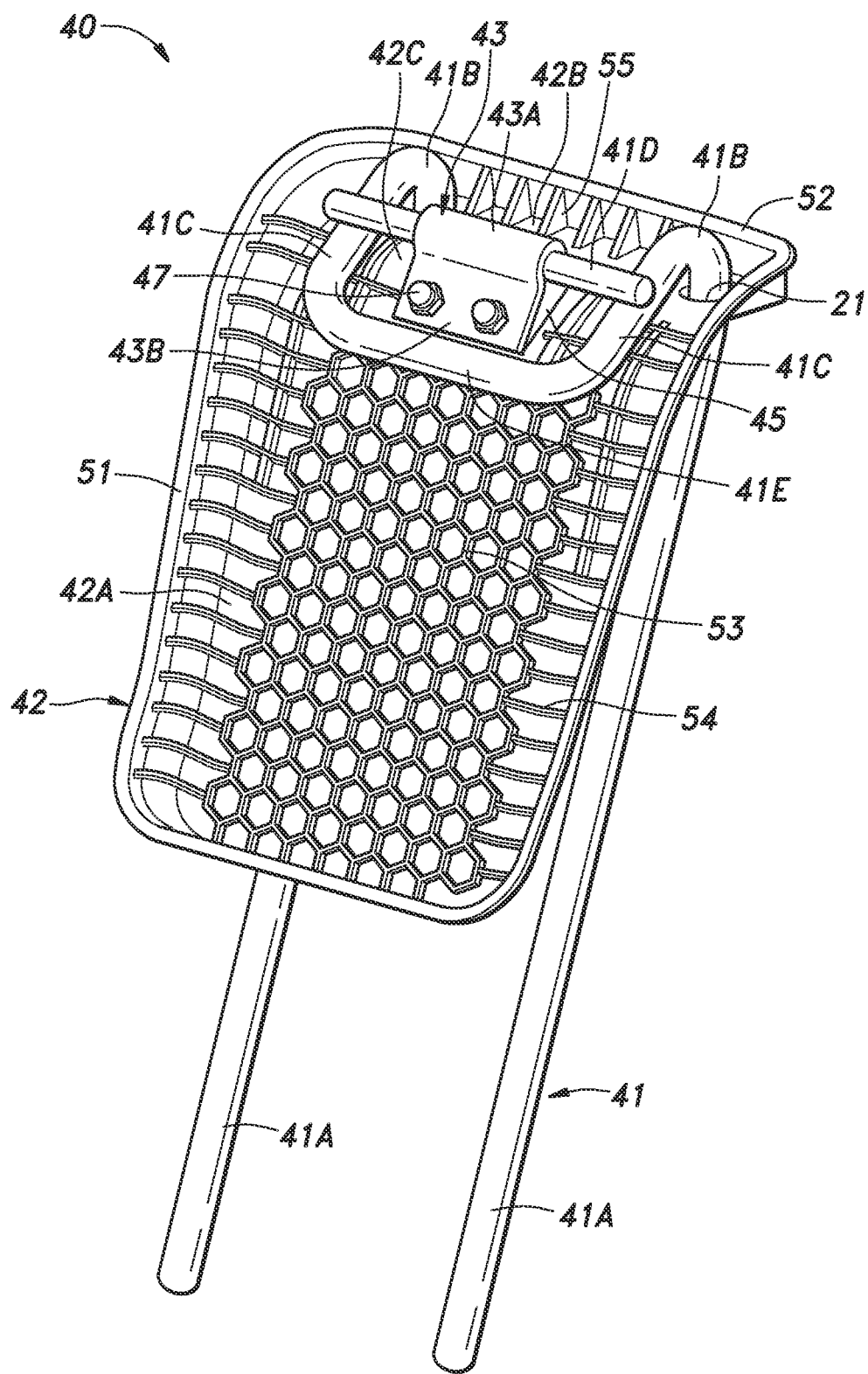
Figure 8:
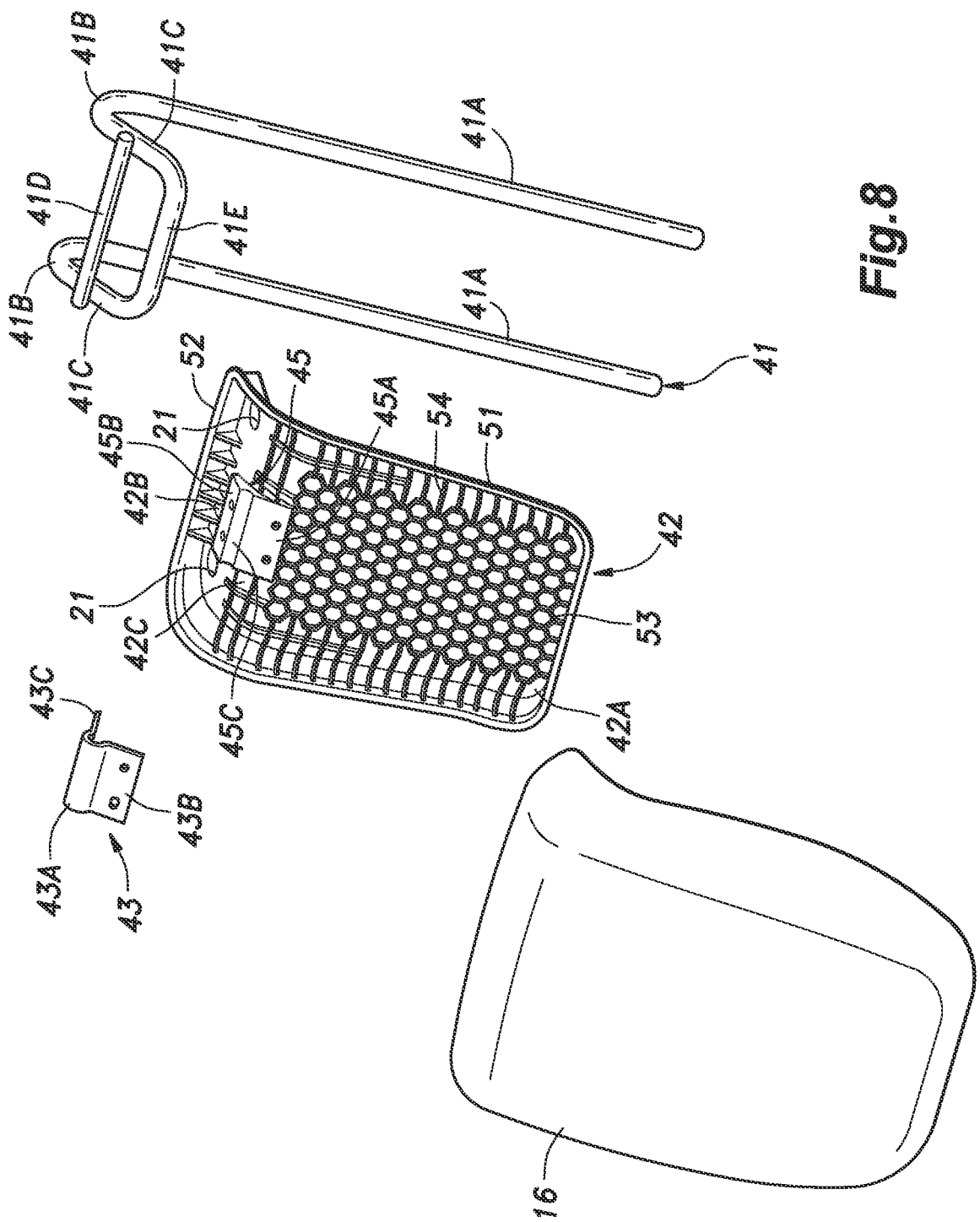
Figure 9:
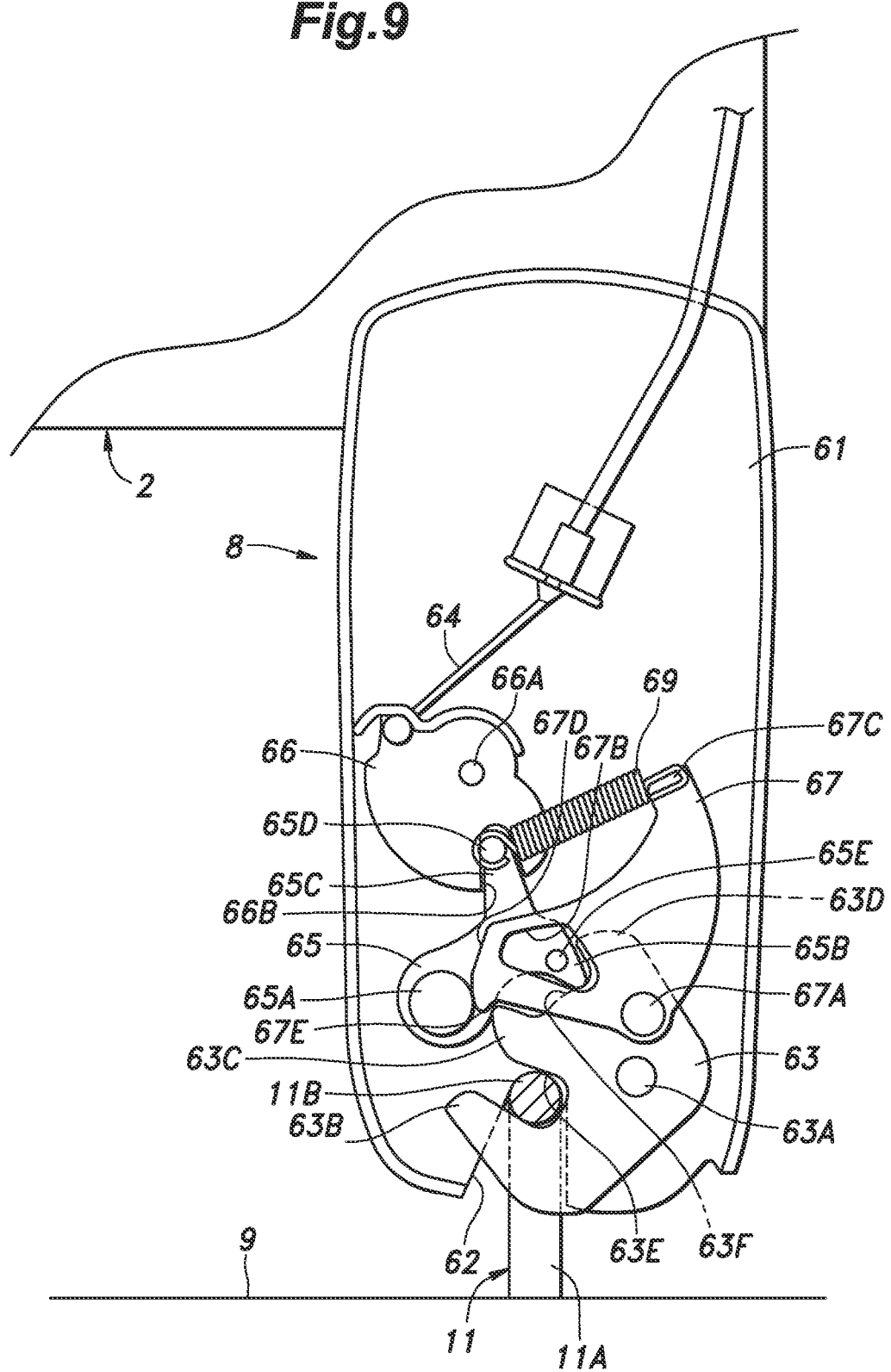
Figure 10:
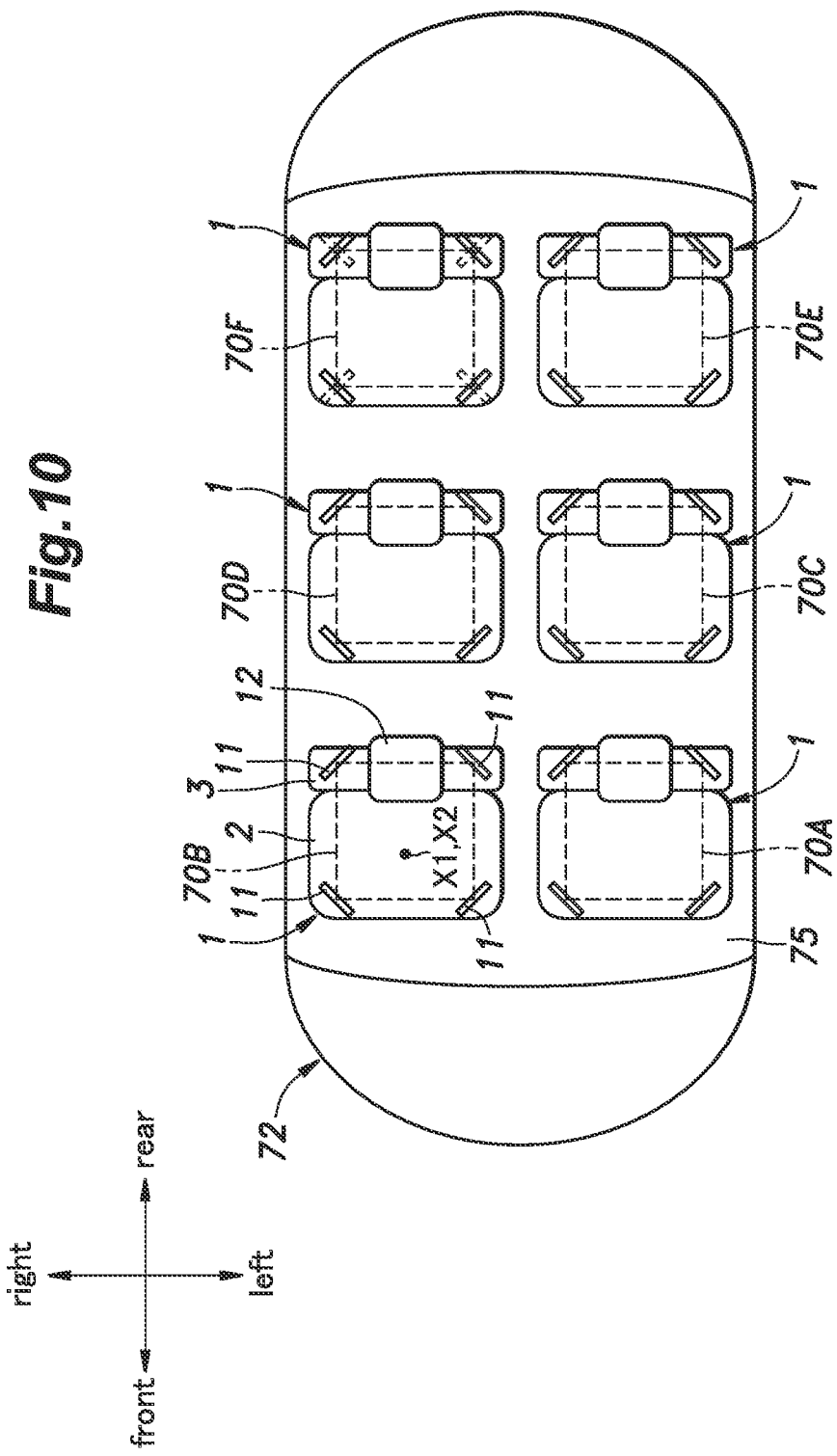
Figure 11:
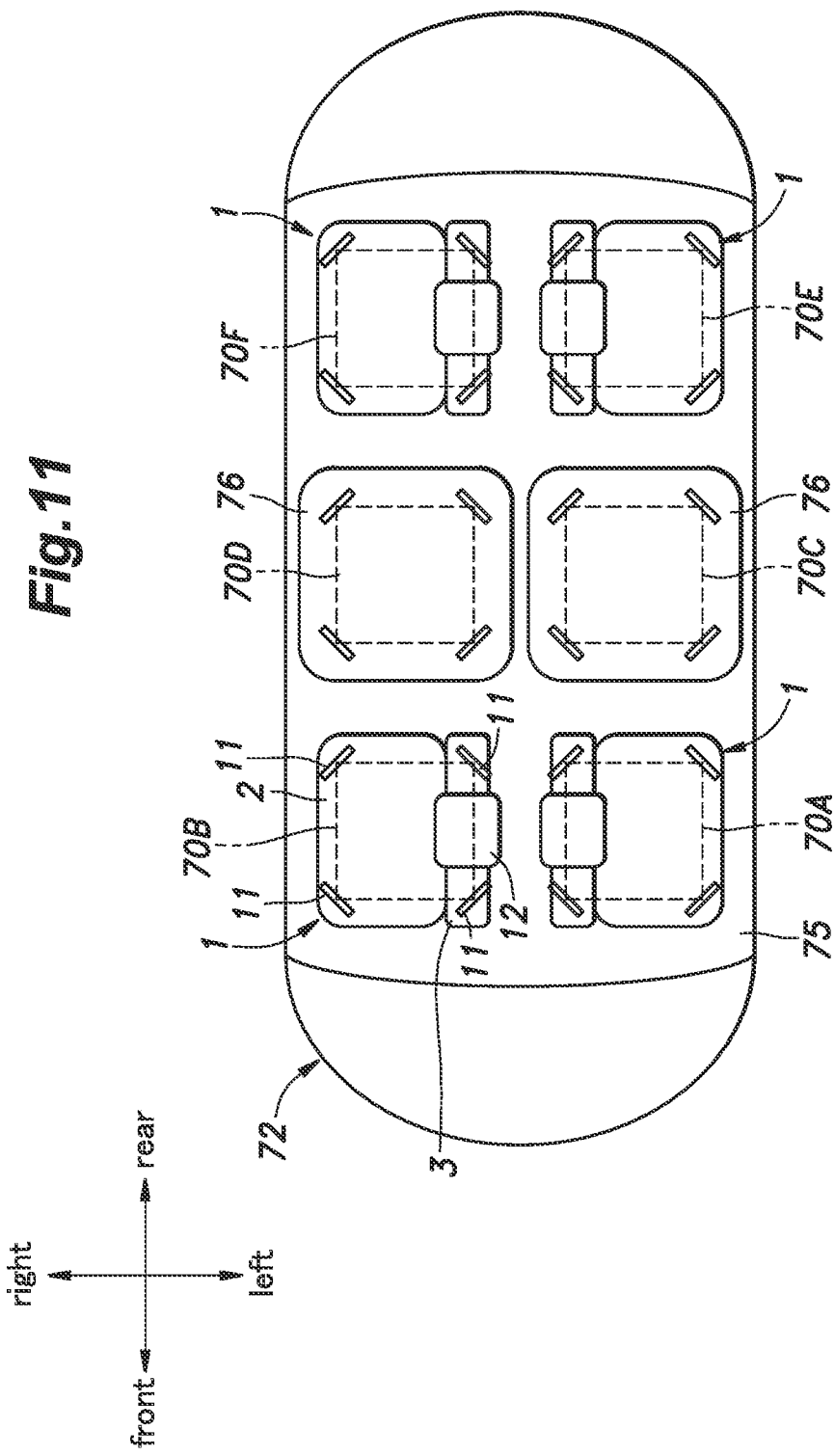
Figure 12:
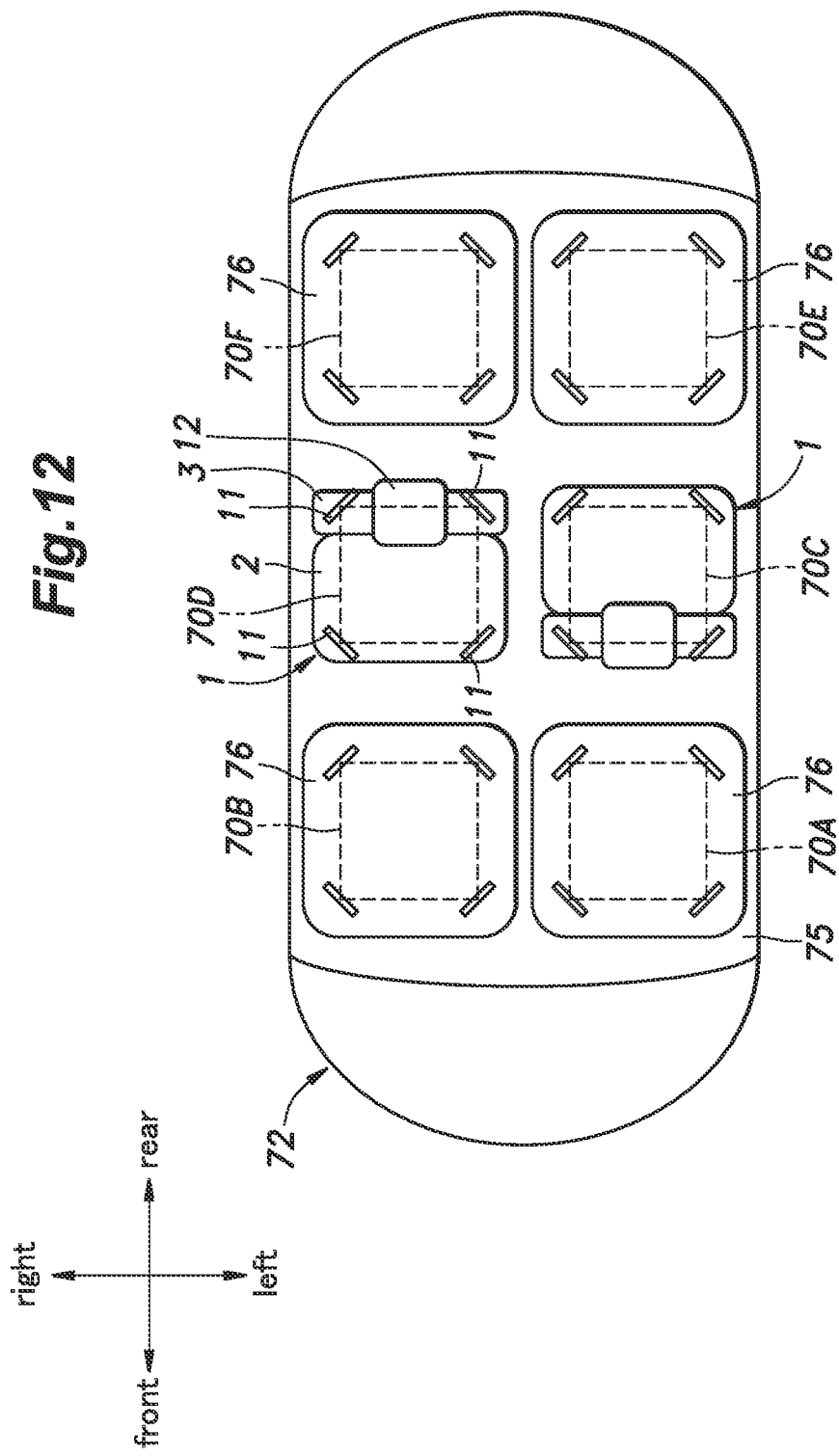
Figure 13:
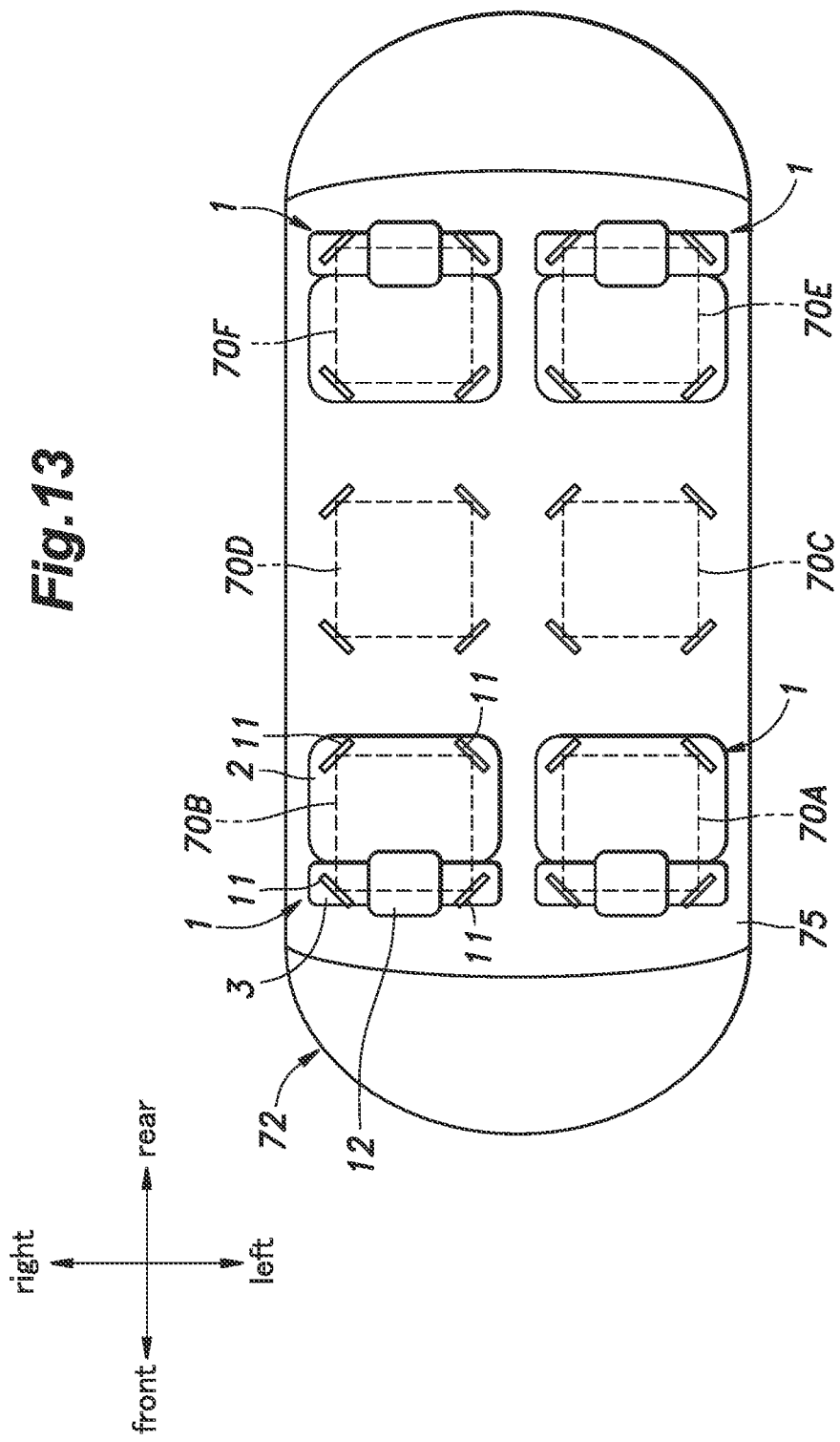
Figure 14:
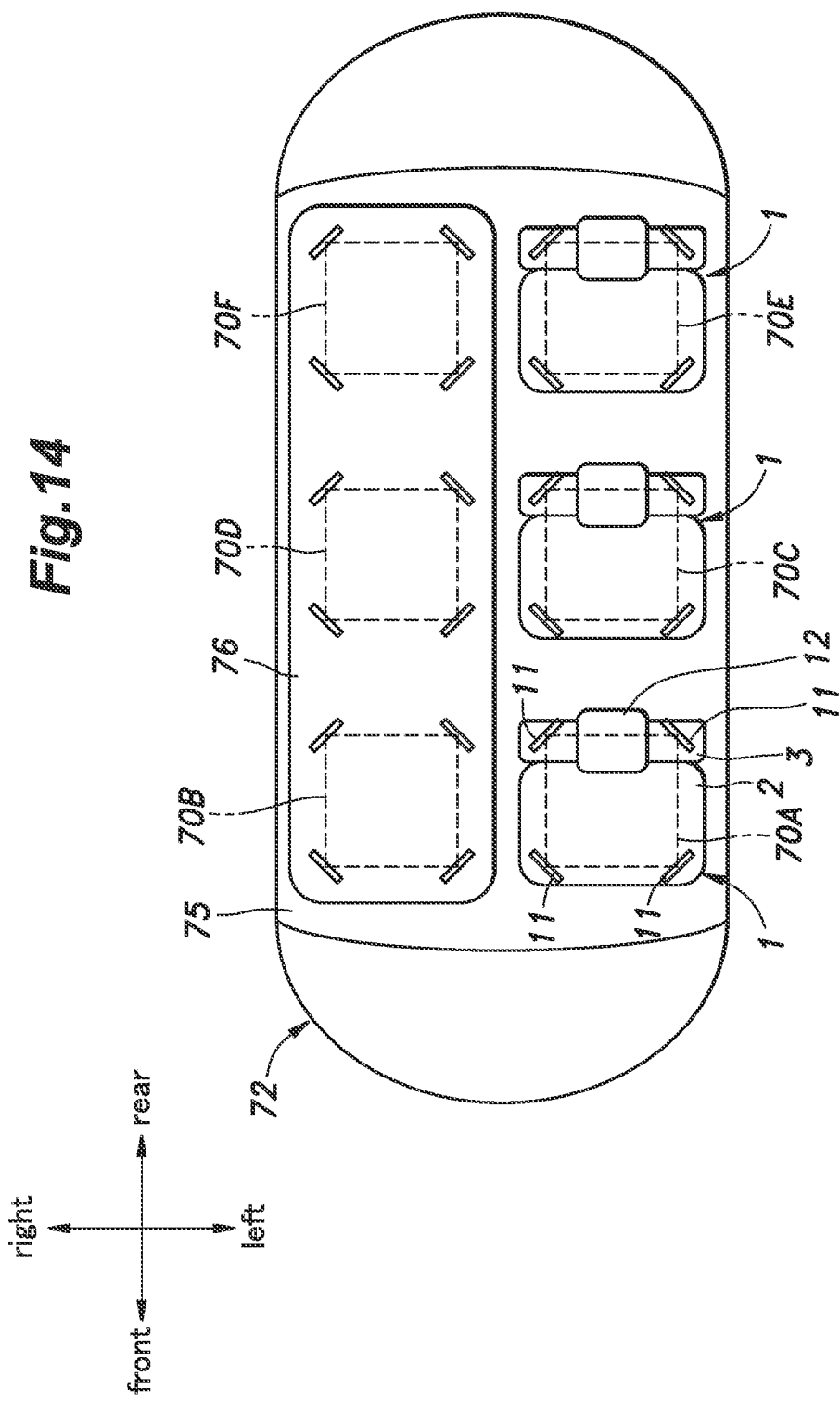
Figure 15:
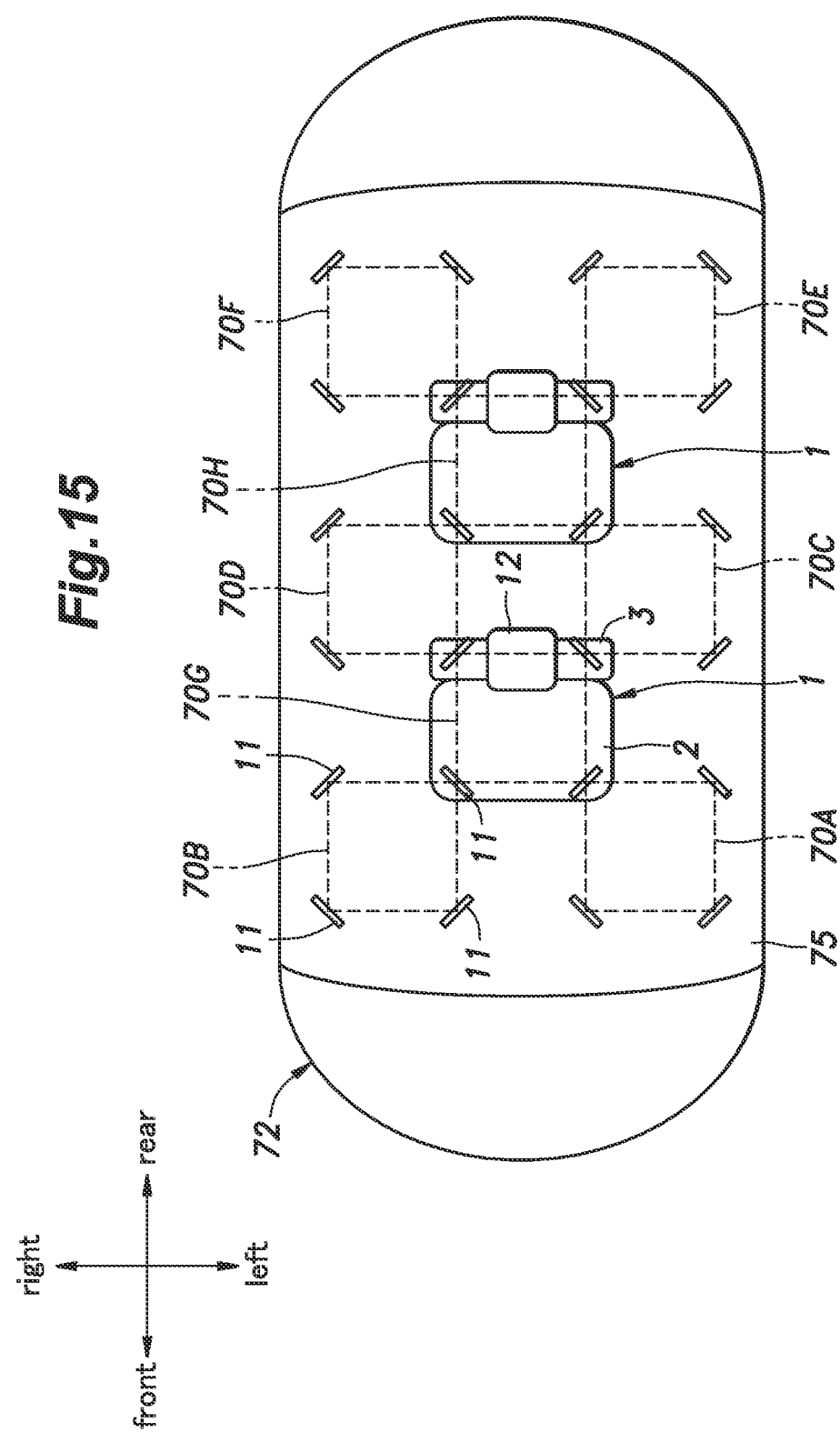
Figure 16:
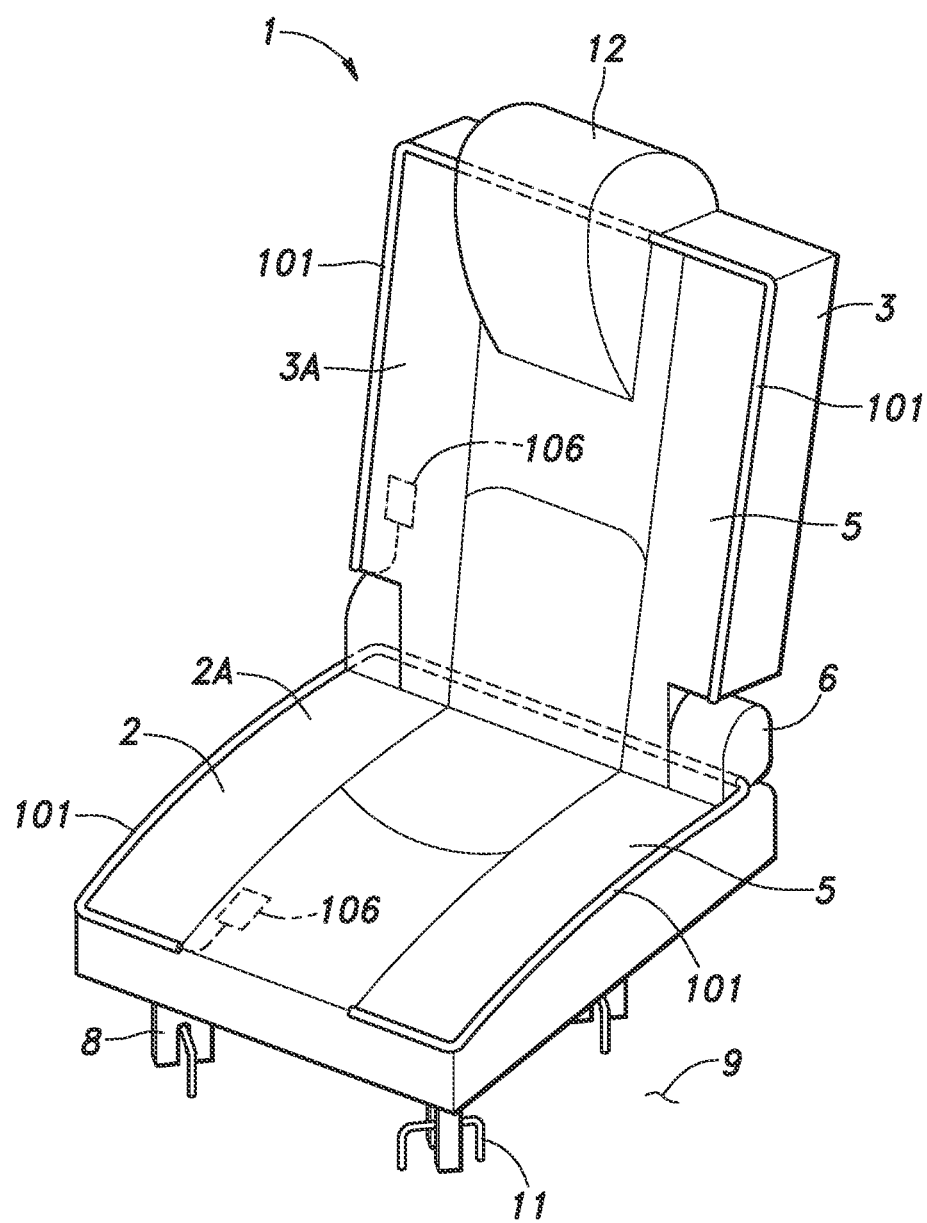
Figure 17:
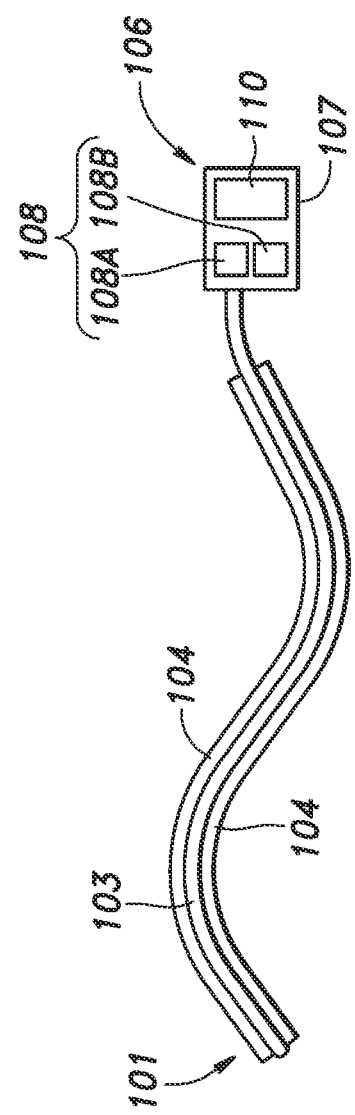
Figure 18:
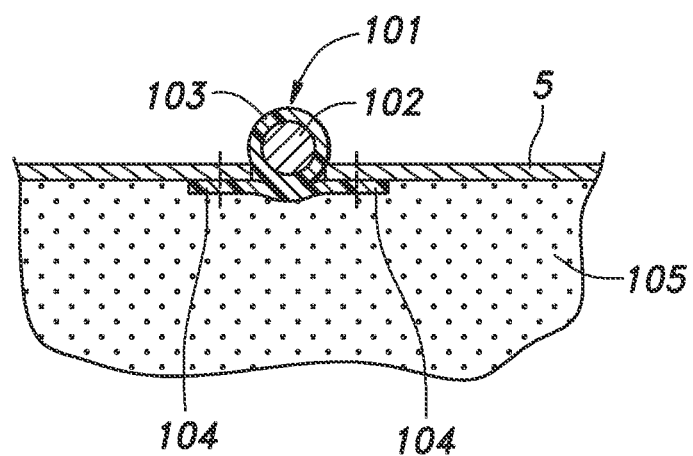
Figure 19:
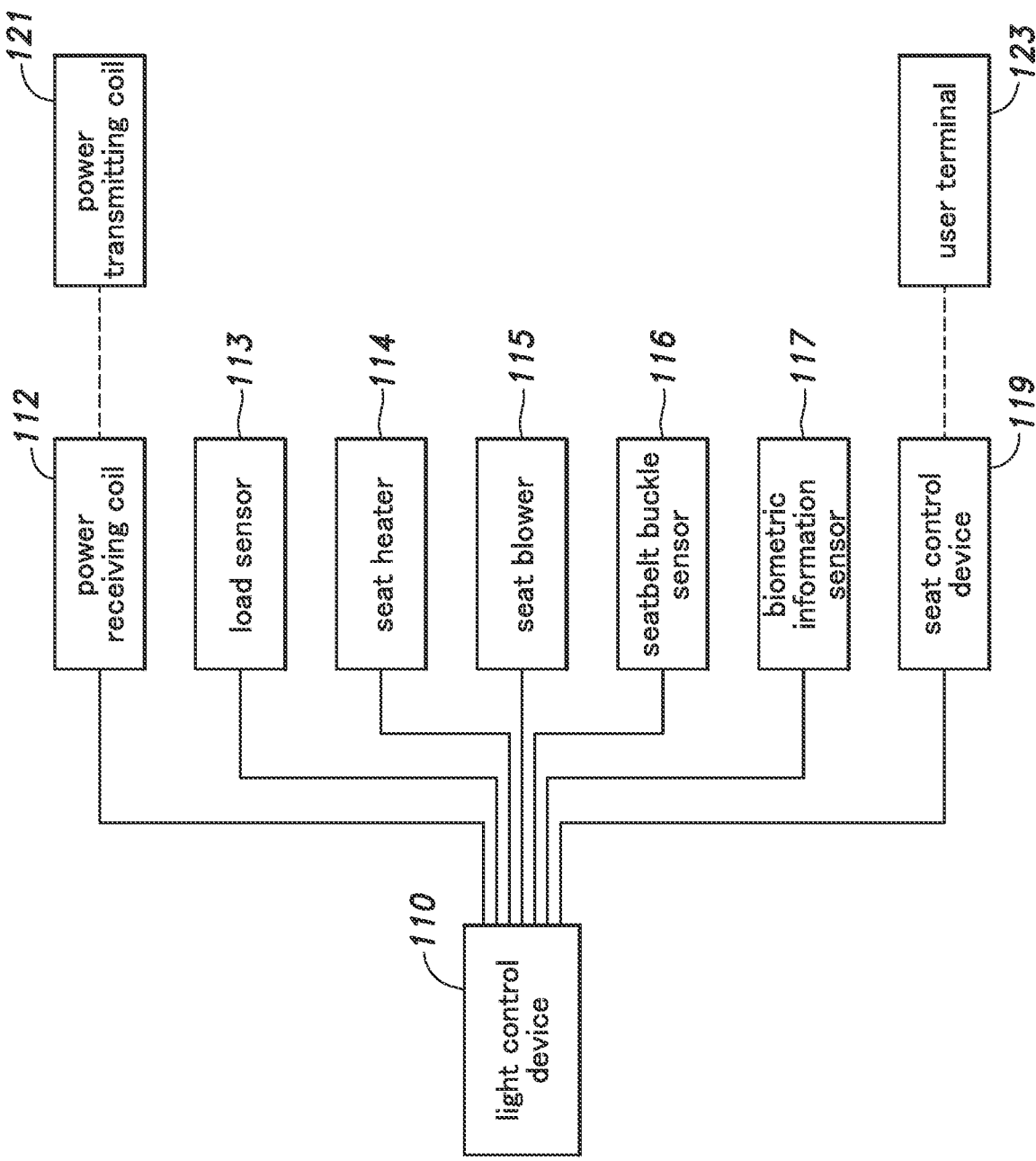
Figure 20:
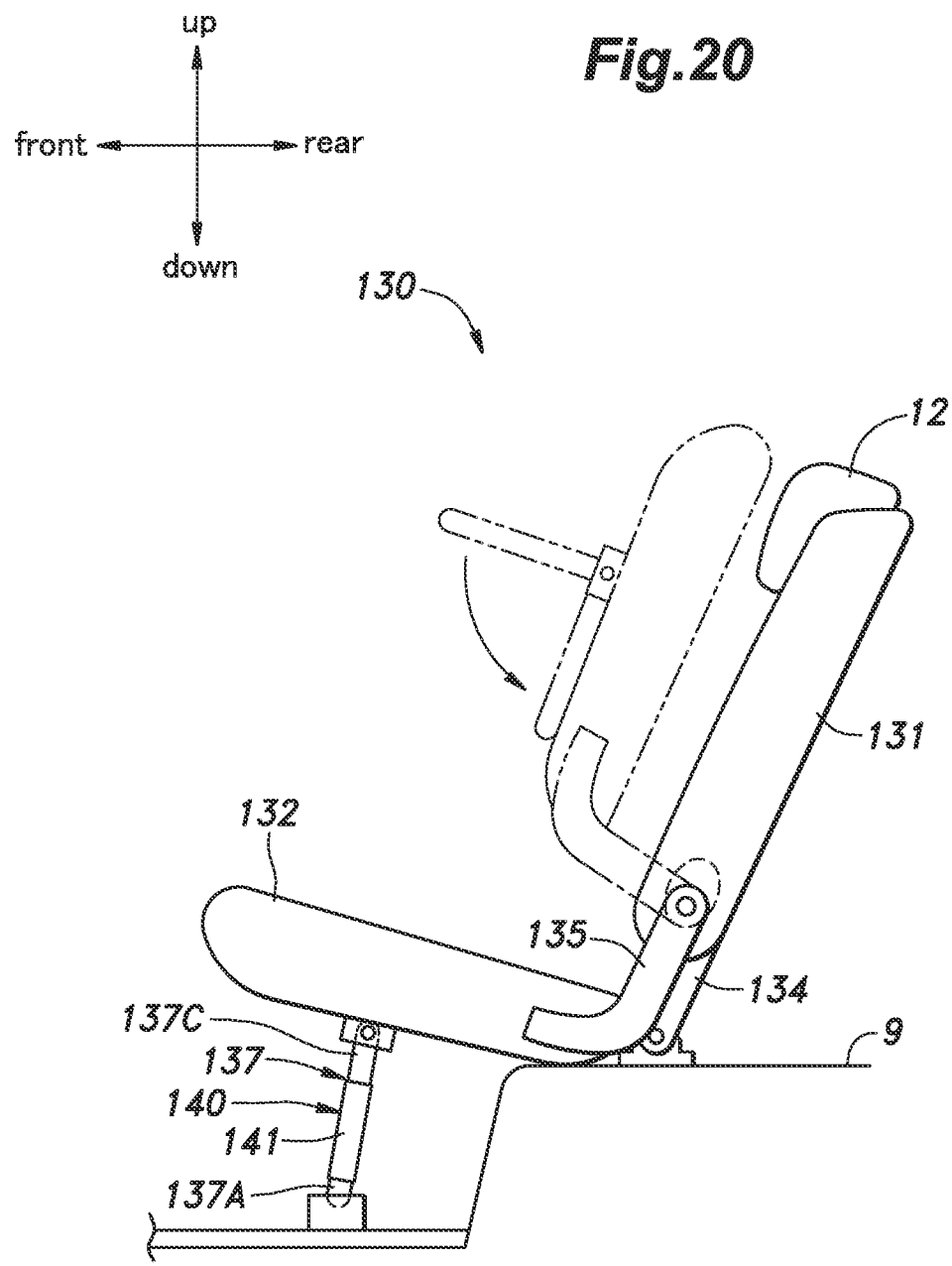
Figure 21:
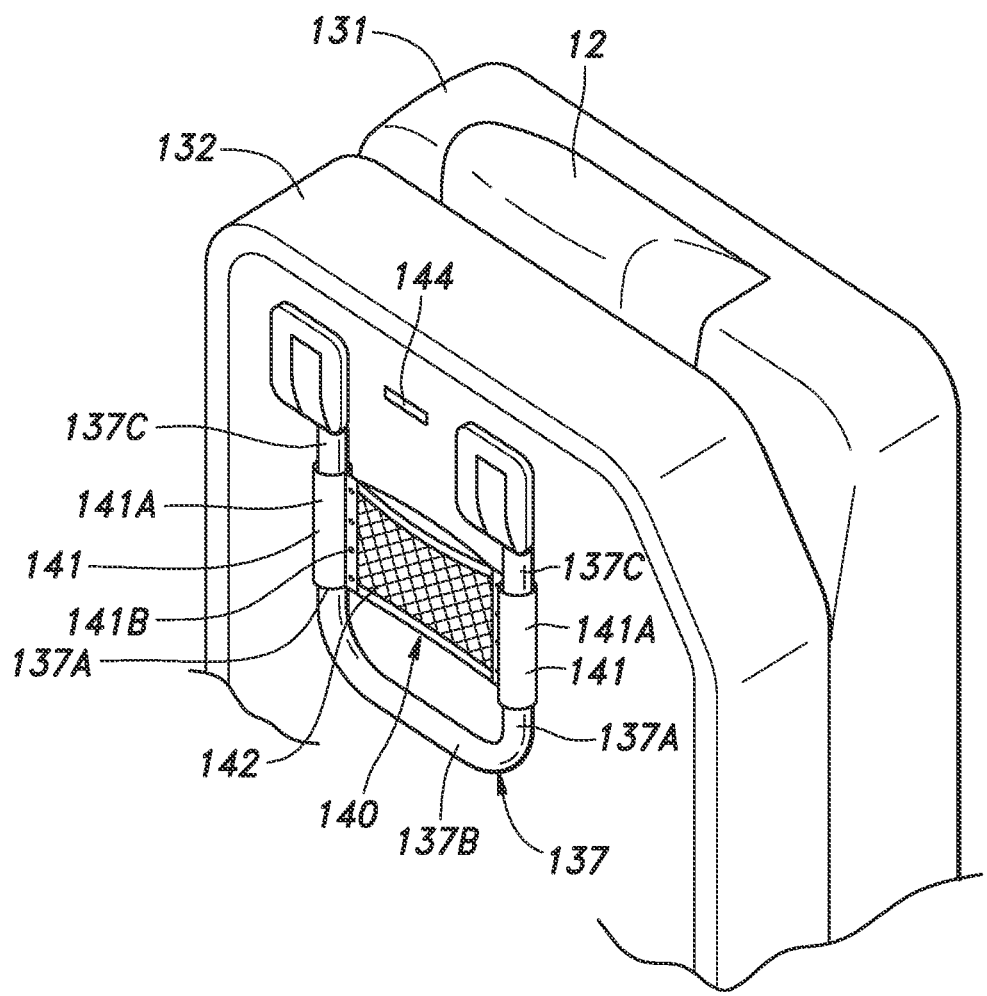
Figure 22:
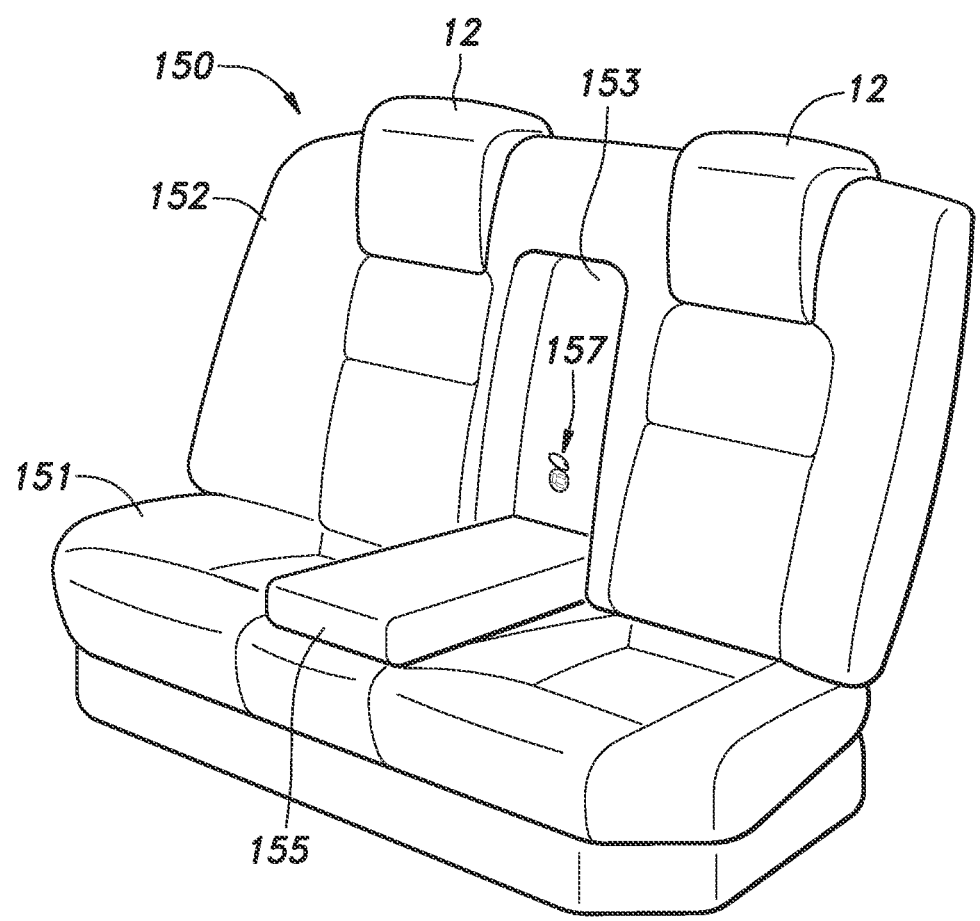

FIG. 1 is a perspective view of a seat according to a first embodiment of the present invention;
FIG. 2 is a sectional view of a headrest;
FIG. 3 is a perspective view of the headrest;
FIG. 4 is a rear view of the headrest;
FIG. 5 is a perspective view as seen from a lower rear side;
FIG. 6 is a sectional view of the headrest;
FIG. 7 is a perspective view of a headrest according to a second embodiment of the present invention;
FIG. 8 is an exploded perspective view of the headrest of the second embodiment;
FIG. 9 is a side view of a coupling device;
FIG. 10 is an explanatory diagram showing a first layout of a passenger compartment;
FIG. 11 is an explanatory diagram showing a second layout of the passenger compartment;
FIG. 12 is an explanatory diagram showing a third layout of the passenger compartment;
FIG. 13 is an explanatory diagram showing a fourth layout of the passenger compartment;
FIG. 14 is an explanatory diagram showing a fifth layout of the passenger compartment;
FIG. 15 is an explanatory diagram showing a sixth layout of the passenger compartment;
FIG. 16 is a perspective view of a seat provided with an light pipe;
FIG. 17 is a diagram illustrating an light pipe and a light generating device;
FIG. 18 is a sectional view showing a structure for mounting the light pipe to a skin member;
FIG. 19 is a diagram showing a mode of connecting an light control device to other devices;
FIG. 20 is a side view of a seat according to a modified embodiment of the present invention;
FIG. 21 is a perspective view of the seat of the modified embodiment in a tip-up state;

FIG. 22 is a perspective view of a seat according to yet another modified embodiment of the present invention; and FIG. 23 is a front view of a connector module.

DESCRIPTION OF THE PREFERRED EMBODIMENT(S)

A vehicle seat provided with a headrest according to the present invention will be described in the following with reference to the appended drawings. The following description of an embodiment of the present invention is directed to an example in which the headrest is applied to an automobile seat.

As shown in FIG. 1, the seat 1 for a vehicle is provided with a seat cushion 2 and a seat back 3 extending upward from a rear part of the seat cushion 2. The seat cushion 2 has a seat surface 2A facing upward to support the buttocks of the occupant. The seat back 3 has a support surface 3A facing forward to support the back of the occupant. The seat cushion 2 and the seat back 3 has a frame structure (not shown in the drawings), a pad (not shown in the drawings) supported by the frame structure, and a skin material 5 covering the pad. The seat back 3 is connected to the seat cushion 2 via a reclining mechanism 6. The reclining mechanism 6 can change the angle of the seat back 3 with respect to the seat cushion 2 as desired.

A plurality of coupling devices 8 are provided in a lower part of the seat cushion 2. The coupling devices 8 can be detachably coupled to corresponding strikers 11 provided on the floor 9 of the vehicle. The user can remove the seat 1 from the floor 9 by disengaging the coupling between the coupling devices 8 and the strikers 11. The coupling device 8 and the striker 11 will be described later.

A headrest 12 is provided on an upper part of the seat back 3. As shown in FIG. 2, the headrest 12 is provided with a pillar member 13, a base member 14, a connecting member 15 for connecting the base member 14 to the pillar member 13, and a pad 16 supported by the base member 14. In this embodiment, the headrest 12 has a skin material 17 that covers the pad 16.

As shown in FIGS. 2 to 6, the pillar member 13 of the headrest 12 of the first embodiment is provided with a left and a right vertical shaft 13A extending upward from an upper part of the seat back 3, a left and a right first horizontal shaft 13C extending forward from upper ends of the vertical shafts 13A via curved sections 13B, respectively, and a second horizontal shaft 13D extending laterally and connected to the front ends of the first horizontal shafts 13C. The left and right vertical shafts 13A extend linearly parallel to each other. The first horizontal shafts 13C are substantially orthogonal to the plane containing the left and right vertical shafts 13A, and extend in the same direction. In the present embodiment, the vertical shafts 13A, the first horizontal shafts 13C, and the second horizontal shaft 13D are formed by bending a metal rod having a circular cross section.

As shown in FIG. 2, the seat back 3 is provided with a left and a right pillar support portion 19 that receive the lower portions of the left and right vertical shafts 13A, respectively. The left and right pillar support portions 19 are formed by tubes that receive the left and right vertical shafts 13A, respectively, and can retain the vertical shafts 13A at a desired position by frictional force. Where the pillar member 13 is supported by the seat back 3, the second horizontal shaft 13D and the left and right first horizontal shafts 13C are located on the front side of the seat back 3, or on the side of the seat occupant side with respect to the upper ends of the vertical shafts 13A.

As shown in FIGS. 2 to 6, the base member 14 is provided with a base vertical portion 14A extending vertically and a base upper portion 14B extending rearward from the upper end of the base vertical portion 14A. A left and a right first hole 21 are passed vertically in the base upper portion 14B. The left and right curved sections 13B or the left and right vertical shafts 13A pass through the left and right first holes 21, respectively, and the left and right first horizontal shafts 13C are positioned above the base upper portion 14B. The base vertical portion 14A is positioned in front of the left and right vertical shafts 13A.

A connecting member 15 pivotably connects the base upper portion 14B to the second horizontal shaft 13D. The connecting member 15 includes a channel-shaped engaging portion 15A that rotatably receives the second horizontal shaft 13D, and a first fastening portion 15B that extends from one side edge of the engaging portion 15A, and is fastened to the base upper portion 14B by a fastening member 22. Further, the connecting member 15 is provided with a second fastening portion 15C that extends from the other side edge of the engaging portion 15A and fastened to the base upper portion 14B by a fastening member 22. More specifically, the engaging portion 15A has a C-shaped cross section and extends in the lateral direction along the outer circumference of the second horizontal shaft 13D. The engaging portion 15A opens toward the rear. The first fastening portion 15B extends rearward from the upper side edge defining the opening of the engaging portion 15A, and is positioned behind the second horizontal shaft 13D. The second fastening portion 15C extends rearward from the lower side edge of the engaging portion 15A defining the opening of the engaging portion 15A, and is located behind the second horizontal shaft 13D. The first fastening portion 15B and the second fastening portion 15C are each formed as a flat plate, and the surfaces thereof face vertically. The engaging portion 15A, the first fastening portion 15B, and the second fastening portion 15C may be formed by bending a single piece of sheet metal.

The base member 14 is provided with a base hole 24 passed through the base member 14 at the boundary between the base upper portion 14B and the base vertical portion 14A. The base hole 24 is passed through the base member 14 in the fore and aft direction and extends in the lateral direction. The upper edge of the base hole 24 is connected to the lower surface of the base upper portion 14B. The second horizontal shaft 13D is positioned at the boundary between the base upper portion 14B and the base vertical portion 14A. More specifically, the second horizontal shaft 13D is positioned in front of the front edge of the base upper portion 14B. The first fastening portion 15B is positioned along the upper surface of the base upper portion 14B. The second fastening portion 15C is passed through the base hole 24, and is positioned along the lower surface of the base upper portion 14B. In other words, the first fastening portion 15B and the second fastening portion 15C are arranged so as to interpose the base upper portion 14B therebetween. The fastening member 22 includes a bolt 22A passed through the first fastening portion 15B, the base upper portion 14B, and the second fastening portion 15C, and a nut 22B threaded with the bolt 22A. The nut 22B may be welded to the second fastening portion 15C so as to facilitate the fastening work of the connecting member 15 to the base upper portion 14B by the bolt 22A.

The distance between the upper side edge and the lower side edge of the engaging portion 15A is set to be smaller than the diameter of the second horizontal shaft 13D. Further, the distance between the first fastening portion 15B and the second fastening portion 15C is set to be smaller than the diameter of the second horizontal shaft 13D. Thereby, the second horizontal shaft 13D is prevented from coming out of the opening of the engaging portion 15A. The second horizontal shaft 13D is rotatably supported by the engaging portion 15A. By applying a frictional force to the outer peripheral surface of the second horizontal shaft 13D by the inner peripheral surface of the engaging portion 15A, the angular position of the second horizontal shaft 13D with respect to the engaging portion 15A can be maintained when a load exceeding a predetermined is not applied to the second horizontal shaft 13D.

As shown in FIG. 2, the engaging portion 15A projects in the axial direction of the bolt 22A beyond the end of the bolt 22A of the fastening member 22. The end of the bolt 22A is provided with head that engages with a tool. Thus, the engaging portion 15A is positioned more away from the upper surface of the base member 14 than the end of the bolt 22A so that the end of the bolt 22A is prevented from abutting against the head of the occupant via the pad 16.

As shown in FIGS. 2 and 3, an upper part of the base vertical portion 14A is provided with a first bulging portion 26 bulging away from the base upper portion 14B beyond the second horizontal shaft 13D. The first bulging portion 26 extends in the lateral direction, and is connected to the lower edge of the base hole 24 at the upper edge thereof. The protruding end of the first bulging portion 26 defines a planar end face. The first bulging portion 26 is positioned between the left and right vertical shafts 13A in front view. The first bulging portion 26 gives a three-dimensional shape to the base vertical portion 14A so to improve the rigidity of the base vertical portion 14A.

A part of the first bulging portion 26 adjoining the second horizontal shaft 13D or the upper edge of the first bulging portion 26 is formed with a recess 26A that receives a part of the connecting member 15. By causing the lower part of the engaging portion 15A of the connecting member 15 to be in the recess 26A, the second horizontal shaft 13D can be brought close to the base member 14 while avoiding contact between the engaging portion 15A and the first bulging portion 26.

The base vertical portion 14A is further provided with at least one second bulging portion 27 that bulges forward and extends downward from the first bulging portion 26. In the present embodiment, the left and right second bulging portions 27 extend vertically and laterally spaced from each other. Further, the base vertical portion 14A is provided with a third bulging portion 28 that bulges forward and extends along the peripheral edge of the base vertical portion 14A. As shown in FIGS. 4 and 5, the second bulging portions 27 and the third bulging portion 28 are connected to each other. A plurality of reinforcing ribs 29 extending orthogonally to the lengthwise direction are provided on the back surface of the second bulging portions 27 and the third bulging portion 28. Further, the back surface of the first bulging portion 26 are also provided with a plurality of reinforcing ribs 29. The second bulging portions 27 and the third bulging portion 28 can improve the rigidity of the base vertical portion 14A.

As shown in FIGS. 3 and 6, the base upper portion 14B has a left and a right groove portion 31 that are recessed downward and extend in the fore and aft direction. As a result, the left and right first horizontal shafts 13C can be positioned in the corresponding groove portions 31 so that the amount of upward protrusion of the first horizontal shafts 13C with respect to the base upper portion 14B can be minimized. The front ends of the left and right groove portions 31 are connected to a groove formed between the first bulging portion 26 and the third bulging portion 28. As shown in FIG. 5, the first holes 21 are positioned at the rear ends of the corresponding groove portions 31. The left and right first holes 21 are elongated in the fore and aft direction, and at least one of the front end and the rear end of each first hole 21 is formed in a substantially triangular shape. In the present embodiment, the front end of each first hole 21 is formed in a substantially triangular shape. When the base member 14 rotates with respect to the pillar member 13, the vertical shafts 13A abut on the front ends of the respective first holes 21 so that the movement of the base member 14 in the lateral direction with respect to the pillar member 13 is restricted, and the base member 14 is prevented from rattling.

As shown in FIG. 3, the rear edge of the base upper portion 14B is provided with an edge wall portion 32 projecting upward. The edge wall portion 32 is curved forward toward the top. On the front side of the edge wall portion 32, a plurality of reinforcing ribs 29 extend from the upper end of the edge wall portion 32 to the upper surface of the base upper portion 14B.

As shown in FIG. 2, the pad 16 includes a pad vertical portion 16A positioned on the front surface of the base vertical portion 14A and a base upper portion 14B extending rearward from the upper end of the pad vertical portion 16A and positioned on the upper surface of the base upper portion 14B. The pad upper portion 16B covers the left and right first horizontal shafts 13C, the second horizontal shaft 13D, and the connecting member 15 from an upper side thereof. The lower surface of the pad upper portion 16B is in contact with the first fastening portion 15B at a part thereof located between the engaging portion 15A and the head of the bolt 22A. As a result, the gap between the pad 16 and the first fastening portion 15B can be minimized so that the deformation of the pad 16 due to such a gap can be minimized.

The height of the headrest 12 with respect to the seat back 3 can be changed by sliding the left and right vertical shafts 13A with respect to the left and right pillar support portions 19. The height of the headrest 12 can be changed between a low position, which is the lowest position, and a high position, which is the highest position, with respect to the seat back 3. When the headrest 12 is in the low position, the rear surface of the base vertical portion 14A abuts on the front surface of the seat back 3, and the lower surface of the base upper portion 14B abuts on the upper end surface of the seat back 3, so that the rotation of the base member 14 with respect to the pillar member 13 is restricted. As shown in FIG. 6, when the headrest 12 is in the high position, the base member 14 can rotate about the second horizontal shaft 13D. The angular range of the base member 14 with respect to the second horizontal shaft 13D is determined by the contact between the vertical shafts 13A and the front and rear ends of the first holes 21.

In the headrest 12, the second horizontal shaft 13D is positioned in front of the vertical shafts 13A owing to the presence of the first horizontal shafts 13C. Therefore, the pillar member 13 can directly receive a part of the load from the front without going through the base member 14 and the connecting member 15. As a result, the load applied to the connecting member 15 that connects the second horizontal shaft 13D to the base member 14 in the headrest 12 can be minimized.

The engaging portion 15A opens rearward, and the first fastening portion 15B and the second fastening portion 15C are fastened to the base upper portion 14B behind the second horizontal shaft 13D. Therefore, when a load is applied to the base member 14 from the front, the engaging portion 15A is kept engaged by the second horizontal shaft 13D. Thereby, the engaging portion 15A is prevented from being dislodged from or moving away from the second horizontal shaft 13D. Further, since the connecting member 15 and the fastening member 22 are positioned behind the second horizontal shaft 13D, the connecting member 15 and the fastening member 22 are prevented from abutting against the occupant's head via the pad 16.

A headrest 40 according to a second embodiment of the present invention which is modified in a certain structure from the first embodiment is described in the following with reference to FIGS. 7 and 8. The headrest 40 of the second embodiment differs from the headrest 40 of the first embodiment in the shapes of the pillar member 41, the base member 42, and the connecting member 43. In describing the headrest 40 of the second embodiment, the parts corresponding to those of the first embodiment are denoted with like numerals without necessarily repeating the description of such parts.

In the headrest 40 of the second embodiment, the pillar member 41 includes a left and a right vertical shaft 41A extending upward from an upper part of the seat back 3, a left and a right first horizontal shaft 41C extending forward from upper ends of the vertical shafts 41A via curved sections 41B, respectively, a second horizontal shaft 41D extending laterally and connected to the front parts of the first horizontal shafts 41C, and a third horizontal shaft 41E extending laterally and connected to the front ends of the first horizontal shafts 41C. The left and right vertical shafts 41A extend linearly in parallel to each other. The left and right first horizontal shafts 41C extend in the fore and aft direction so as to form an acute angle with respect to the corresponding vertical shafts 41A. In the present embodiment, the left and right vertical shafts 41A, the left and right first horizontal shafts 41C, and the third horizontal shaft 41E are formed by bending a metal rod having a circular cross section. The second horizontal shaft 41D may be connected to the left and right first horizontal shafts 41C by welding or the like.

The base member 42 includes a base vertical portion 42A extending vertically and a base upper portion 42B extending rearward from the upper end of the base vertical portion 42A. A curved surface portion 42C that smoothly connects the base vertical portion 42A with the base upper portion 42B is provided at the boundary between the base vertical portion 42A and the base upper portion 42B. A fastening seat 45 projecting forward and upward from a laterally central part of the curved surface portion 42C. The fastening seat 45 has a first fastening surface 45A facing forward and a second fastening surface 45B extending rearward from the upper end of the first fastening surface 45A and facing upward. At the boundary between the first fastening surface 45A and the second fastening surface 45B, a bearing groove 45C which is recessed rearward and extends in the lateral direction is provided. The bearing groove 45C has a semicircular cross section.

The base upper portion 42B is formed with a left and a right first hole 21 passed vertically therethrough. The curved sections 41B or the vertical shafts 41A pass through the respective first holes 21, and the first horizontal shafts 41C are positioned above the base upper portion 42B. The base vertical portion 42A is positioned in front of the vertical shafts 41A.

The connecting member 43 rotatably connects the fastening seat 45 to the second horizontal shaft 41D. The connecting member 43 is provided with a channel-shaped engaging portion 43A that pivotably receives the second horizontal shaft 41D, a first fastening portion 43B extending from a side edge of the engaging portion 43A, and a second fastening portion 43C extending from the other side edge of the engaging portions 43A. More specifically, the engaging portion 43A has a semi-circular cross section and extends in the lateral direction along the outer periphery of the second horizontal shaft 41D. The engaging portion 43A opens toward the rear. The first fastening portion 43B extends downward from the lower side edge defining the opening of the engaging portion 43A. The second fastening portion 43C extends rearward from the upper side edge defining the opening of the engaging portion 43A. The first fastening portion 43B is formed by a flat plate member, and has major surfaces facing in the fore and aft direction. The second fastening portion 43C is formed by a flat plate member, and has major surfaces facing vertically. The engaging portion 43A, the first fastening portion 43B, and the second fastening portion 43C may be formed by bending a single piece of sheet metal.

The rear side of the second horizontal shaft 41D is received by the bearing groove 45C. The first fastening portion 43B extends along the first fastening surface 45A and is fastened by fasteners 47 consisting of bolts and nuts. The second fastening portion 43C extends along the second fastening surface 45B and is fastened by fasteners 47 consisting of bolts and nuts. The first fastening portion 43B is fastened to the first fastening surface 45A, and the second fastening portion 43C is fastened to the second fastening surface 45B so that the second horizontal shaft 41D is interposed between the bearing groove 45C and the engaging portion 43A. As a result, the second horizontal shaft 41D is rotatably supported between the bearing groove 45C and the engaging portion 43A. The connecting member 43 clamps the second horizontal shaft 41D against the base member 42 so as to generate a frictional force acting against the rotation of the second horizontal shaft 41D. By applying this frictional force to the outer surface of the second horizontal shaft 41D via the inner surfaces of the engaging portion 43A and the bearing groove 45C, the angular position of the second horizontal shaft 41D is kept fixed with respect to the engaging portion 43A and the bearing groove 45C unless a load exceeding a predetermined value is applied. The angle formed between the first fastening portion 43B and the second fastening portion 43C may be, for example, between 90 degrees and 135 degrees.

The third horizontal shaft 41E is positioned forward and downward with respect to the second horizontal shaft 41D, and is positioned in front of the base vertical portion 42A. The lower edge of the third horizontal shaft 41E may be positioned below the lower edge of the second fastening portion 43C.

A first edge wall 51 projects forward from the lower edge and the lateral side edges of the base vertical portion 42A. A second edge wall 52 projects from the rear edge and the lateral side edges of the base upper portion 42B. The first edge wall 51 and the second edge wall 52 are connected to each other to jointly form an annular shape. A part of the front surface of the base vertical portion 42A located between the left and right vertical shafts 41A in front view is provided with a first reinforcing structure 53. The first reinforcing structure 53 is formed by a plurality of ribs formed in a honeycomb shape and protruding forward. The first reinforcing structure 53 is connected to the first edge wall 51 by a second reinforcing structure 54 provided on the front surface of the base vertical portion 42A on each side thereof. The second reinforcing structure 54 may be a plurality of ribs extending laterally on the front surface of the base vertical portion 42A. Further, the base upper portion 42B may be provided with a plurality of reinforcing ribs 55 extending from the second edge wall 52 to the upper surface of the base upper portion 42B.

The pad 16 includes a pad vertical portion 16A positioned on the front surface side of the base vertical portion 42A, and a pad upper portion 16B extending rearward from the upper end of the pad vertical portion 16A and positioned on the upper surface side of the base upper portion 42B. The pad 16 covers the left and right first horizontal shafts 41C, the second horizontal shaft 41D, the third horizontal shaft 41E, and the connecting member 43.

In the headrest 40 of the second embodiment, the base member 42 can be pivoted around the second horizontal shaft 41D. The rotation of the base member 42 relative to the second horizontal shaft 41D in one direction is limited by the base vertical portion 42A abutting against a part of the left and right first horizontal shafts 41C located ahead of the second horizontal shaft 41D or the third horizontal shaft 41E. The rotation of the base member 42 relative to the second horizontal shaft 41D in the other direction is restricted by the upper surface of the base upper portion 42B abutting against a part of the lateral first horizontal shafts 41C behind the second horizontal shaft 41D.

Next, the structure for mounting the seat 1 provided with the headrest 12 (40) to the floor 9 will be described. As described earlier, the floor 9 is provided with a plurality of strikers 11, and the seat 1 is provided with a plurality of coupling devices 8. In the illustrated embodiments, as shown in FIGS. 1 and 10, the seat 1 is provided with four coupling devices 8. The coupling devices 8 are provided on the front left portion, the front right portion, the rear left portion, and the rear right portion of the lower part of the seat cushion 2. The four coupling devices 8 may be arranged at the vertices of a square when viewed from above.

Since the coupling devices 8 have the same configuration, only one of them will be described in the following. As shown in FIG. 9, the coupling device 8 is provided with a base plate 61 extending downward from the seat cushion 2. A slot 62 for receiving the striker 11 is formed at the lower end of the base plate 61. The slot 62 consists of a notch which is recessed upward from the lower end of the base plate 61, and passed through the base plate 61 in the horizontal direction. The latch 63 is rotatably provided on the base plate 61. The latch 63 can be rotated between a lock position located in the slot 62 for engaging the striker 11 and a release position displaced from the slot 62 for releasing the striker 11. The latch 63 may be rotated by the user via a control cable 64.

As shown in FIG. 9, the base plate 61 is fitted with a ratchet 65 and an open lever 66 in addition to the latch 63. Further, the latch 63 is provided with an actuating lever 67.

The latch 63 is rotatably supported by the base plate 61 by a latch shaft 63A. The latch shaft 63A extends parallel to the extending direction of the slot 62. The latch shaft 63A is located behind the bottom end of the slot 62. The latch 63 includes a first hook portion 63B, a second hook portion 63C, a third hook portion 63D, a striker receiving groove 63E, and a lock groove 63F. The striker receiving groove 63E is formed between the first hook portion 63B and the second hook portion 63C, a second hook portion 63C is formed between the striker receiving groove 63E and the lock groove 63F, and a lock groove 63F is formed between the second hook portion 63C and the third hook portion 63D.

The ratchet 65 is rotatably supported by the base plate 61 by a ratchet shaft 65A. The ratchet shaft 65A extends in parallel with the latch shaft 63A. The ratchet shaft 65A is positioned so as to be obliquely displaced upward and forward from the bottom of the slot 62. The ratchet 65 includes a locking arm 65B and an actuating arm 65C extending radially outward from the ratchet shaft 65A. The actuating arm 65C is provided with an engaging pin 65D. The engaging pin 65D extends parallel to the ratchet shaft 65A. The locking arm 65B is provided with a cam follower 65E consisting of a pin protruding in parallel with the ratchet shaft 65A.

The open lever 66 is rotatably supported by the base plate 61 by a lever shaft 66A. The lever shaft 66A is extends in parallel with the latch shaft 63A. The lever shaft 66A is positioned above the ratchet shaft 65A.

The open lever 66 is provided with an engaging groove 66B on an outer peripheral portion thereof to receive the engaging pin 65D of the ratchet 65. By engagement of the engaging pin 65D with the engaging groove 66B, the ratchet 65 rotates in response to the rotation of the open lever 66. One end of the control cable 64 is connected to an outer peripheral part of the open lever 66, and the other end of the control cable 64 is connected to an operating lever or actuator (not shown in the drawings). The open lever 66 rotates in response to the operation of the control cable 64 causing the ratchet 65 to rotate.

The actuating lever 67 is rotatably supported by the latch 63 via the connecting shaft 67A. The connecting shaft 67A extends in parallel with the latch shaft 63A. The connecting shaft 67A is positioned on the side of the third hook portion 63D with respect to the latch shaft 63A. The actuating lever 67 includes an inscribed cam 67B, a spring engaging portion 67C, a sliding contact surface 67D and a contact portion 67E. The contact portion 67E projects in the circumferential direction with respect to the connecting shaft 67A towards the ratchet shaft 65A. The sliding contact surface 67D extends from the contact portion 67E in a circumferential direction with respect to the connecting shaft 67A on a side remote from the ratchet shaft 65A. The sliding contact surface 67D is formed in a substantially arc shape centered around the connecting shaft 67A. The inscribed cam 67B is provided between the sliding contact surface 67D and the connecting shaft 67A. The inscribed cam 67B consists of an opening passed through the actuating lever 67 from one side surface of the other. A cam follower 65E is positioned inside the inscribed cam 67B.

The spring engaging portion 67C is provided on the opposite side of the contact portion 67E of the sliding contact surface 67D along the circumferential direction centered around the connecting shaft 67A, and protrudes radially outward with respect to the connecting shaft 67A. The spring engaging portion 67C and the engaging pin 65D of the ratchet 65 are connected to each other by a tension spring 69. The tension spring 69 rotationally urges the actuating lever 67 so as to bring the contact portion 67E toward the ratchet shaft 65A, and rotationally urges the ratchet 65 so as to bring the locking arm 65B toward the latch 63.

The latch 63 can rotate between a lock position where the first hook portion 63B enters the slot 62 so as to extend across the slot 62 and a release position where the first hook portion 63B is displaced out of the slot 62 and the second hook portion 63C is pivoted into the slot 62.

When the latch 63 is in the lock position, the ratchet 65 is urged by the tension spring 69 so as to maintain the locking arm 65B pushed into the lock groove 63F of the latch 63. As a result, the latch 63 is maintained in the lock position. At this time, the actuating arm 65C is in sliding contact with the ratchet shaft 65A at a sliding contact portion thereof.

When tension is applied to the control cable 64 by the user's operation or the like with the latch 63 in the lock position, the open lever 66 rotates so as to cause the ratchet 65 to rotate and the locking arm 65B to be released from the lock groove 63F. At this time, the entire actuating lever 67 moves toward the ratchet 65 owing to the urging force of the tension spring 69. As a result, the connecting shaft 67A moves toward the ratchet 65 so as to cause the latch 63 to rotate from the lock position to the release position. In this state, when the tension of the control cable 64 is released, the ratchet 65 is rotated toward the latch 63 under the biasing force of the tension spring 69, and the locking arm 65B urges the latch 63 toward the release position. As described above, when the latch 63 is in the release position, the latch 63 is maintained in the release position even if tension is not applied to the control cable 64.

When the striker 11 is pushed into the slot 62 while the latch 63 is in the release position, the second hook portion 63C is pushed into the bottom side of the slot 62 by the striker 11. As a result, the ratchet 65 is pushed away by the latch 63 against the biasing force of the tension spring 69 so that the latch 63 rotates toward the lock position. When the latch 63 reaches the lock position, the engaging portion 15A of the ratchet 65 is pushed into the lock groove 63F under the biasing force of the tension spring 69, and the latch 63 is maintained in the lock position. At this time, the striker 11 is positioned between the first hook portion 63B and the second hook portion 63C in the slot 62, and cannot be dislodged from the slot 62.

The coupling devices 8 are arranged at an interval of 90 degrees around a cushion center axis X1 extending vertically through the center of the seat cushion 2. The coupling devices 8 are arranged on the seat cushion 2 such that the slots 62 of the coupling devices 8 are at an equal distance from the cushion center axis X1. Further, the coupling devices 8 are arranged on the seat cushion 2 so that the coupling devices 8 are oriented in a rotationally symmetric manner around the cushion center axis X1. In particular, the coupling devices 8 provided on the front left and front right parts of the seat cushion 2 are oriented such that the base plates 61 are tilted laterally inward as one moves rearward, and the coupling devices 8 provided on the rear left and rear right parts of the seat cushion 2 are oriented such that the base plates 61 are tilted laterally outward as one moves rearward. The slots 62 of the coupling devices 8 extend in the radial direction about the cushion center axis X1. In this embodiment, the slots 62 of the coupling devices 8 are tilted by 45 degrees with respect to the fore and aft direction.

In the mounting region of the floor 9 where the seat 1 mounting, the four strikers 11 are arranged so as to correspond to the slots 62 of the coupling devices 8. Each striker 11 has a pair of pillar portions 11A protruding vertically upward from the floor 9 in a mutually spaced apart relationship, and a beam portion 11B connecting the upper ends of the pillar portions 11A to each other. The mounting region 70 is formed in a square shape, with the front and rear edges extending laterally, and the left and right edges extending in the fore and aft direction. The four strikers 11 are positioned in the front left portion, the front right portion, the rear left portion, and the rear right portion of the mounting region 70, respectively.

The strikers 11 are arranged at an interval of 90 degrees around a mounting region center axis X2 extending vertically through the center of the mounting region 70. The strikers 11 are arranged on the floor 9 so as to be at an equal distance from the mounting region center axis X2. The distance between each striker 11 and the mounting region center axis X2 is equal to the distance between the slot 62 of each coupling device 8 and the cushion center axis X1. Further, the strikers 11 are arranged on the floor 9 so that the strikers 11 are oriented in a rotationally symmetric manner around the mounting region center axis X2. In particular, the strikers 11 provided on the front left and front right parts of the mounting region 70 are oriented such that the beam portions 11B are tilted laterally outward as one moves rearward, and the strikers 11 provided on the rear left and rear right parts of the mounting region are oriented such that the beam portions 11B are tilted laterally inward as one moves rearward. The beam portions 11B of the strikers 11 extend in the tangential direction about the mounting region center axis X2.

The seat 1 is mounted on the mounting region 70, and the four coupling devices 8 of the seat 1 are detachably coupled to the four strikers 11 of the mounting region 70, respectively. The cushion center axis X1 is positioned so as to coincide with the mounting region center axis X2. By changing the strikers 11 to which the coupling devices 8 are coupled, the direction of the seat 1 with respect to the vehicle 72 can be selected so as to face forward, leftward, rightward, or rearward. For example, the vehicle seat 1 may face forward with respect to the vehicle 72 by coupling the coupling device 8 on the front left portion of the seat cushion 2 with the striker 11 on the front left portion of the seat mounting region 70, the coupling device 8 on the front right portion of the seat cushion 2 with the striker 11 on the front right portion of the seat mounting region 70, the coupling device 8 on the rear left portion of the seat cushion 2 with the striker 11 with the rear left portion of the seat mounting region 70, and the coupling device 8 on the rear right portion of the seat cushion 2 with the rear right portion of the seat mounting region 70. The vehicle seat 1 may face leftward with respect to the vehicle 72 by coupling the coupling device 8 on the front left portion of the seat cushion 2 with the striker 11 on the rear left portion of the seat mounting region 70, the coupling device 8 on the front right portion of the seat cushion 2 with the striker 11 on the front left portion of the seat mounting region 70, the coupling device 8 on the rear left portion of the seat cushion 2 with the striker 11 with the rear right portion of the seat mounting region 70, and the coupling device 8 on the rear right portion of the seat cushion 2 with the front right portion of the seat mounting region 70. By coupling the four coupling devices 8 of the seat 1 to the four strikers 11 of the mounting region 70, respectively, the seat 1 is restricted from moving horizontally and vertically with respect to the floor 9.

As shown in FIG. 10, the floor 9 is provided with a plurality of mounting regions 70A to 70F. For example, the floor 9 of the passenger compartment 75 may be provided with six mounting regions 70A to 70F: front row left side, front row right side, middle row left side, middle row right side, rear row left side, and rear row right side. The seats 1 described above can be detachably attached to some of the mounting regions 70A to 70F. The orientation of the seat 1 mounted on each of the mounting regions 70A to 70F can be selected from front, left, right, and rear. The mounting regions 70A to 70F may be configured to mount attachments 76 other than seats 1. For instance, the attachments 76 may include a table, a shelf, a storage box, or the like. The lower end of the attachment 76 may be provided with coupling devices 8 that can be detachably coupled to four strikers 11 in at least one of the mounting regions 70A to 70F. The coupling devices 8 provided on the attachment 76 may have the same configuration as the coupling devices 8 provided on the seat 1.

FIG. 10 shows a first layout of the passenger compartment 75. In the first layout, the seats 1 are mounted on all the mounting regions 70A to 70F, and all face forward.

FIG. 11 shows a second layout of the passenger compartment 75. In the second layout, a seat 1 is mounted in the mounting region 70A on the left side of the front row so as to face left, another seat 1 is mounted in the mounting region 70B on the right side of the front row so as to face right, yet another seat 1 is mounted in the mounting region 70E on the left side of the rear row so as to face left, yet another seat 1 is mounted in the mounting region 70F on the right side of the rear row so as to face right, and a pair of attachments 76 are mounted in the mounting regions 70C and 70D on the left side of the middle row and the right side of the middle row, respectively. The attachments 76 may include a table, a shelf, or a storage box. The second layout can provide a private space for the occupant seated in each seat 1. Therefore, the second layout is suitable for ride share vehicles.

FIG. 12 shows a third layout of the passenger compartment 75. In the third layout, a seat 1 is mounted in the mounting region 70D on the right side of the middle row so as to face forward, another seat 1 is mounted in the mounting region 70C on the left side of the middle row so as to face rearward, and attachments 76 are attached to the mounting regions 70A, 70B, 70E, and 70F on the left side and the right side of the front row, and the left side and the right side of the rear row, respectively. The attachments 76 on the left side of the front row and the right side of the rear row may include, for example, a shelf and a storage box, and the attachments 76 on the right side of the front row and the left side of the rear row may include a table. In the third layout, two occupants can each use two of the attachments 76.

FIG. 13 shows a fourth layout of the passenger compartment 75. In the fourth layout, a pair of seats 1 are mounted in the mounting regions 70A and 70B on the left side and the right side of the front row, respectively, so that the seats 1 face the rear, and another pair of seats 1 are mounted in the mounting regions 70E and 70F on the left side and the right side of the rear row, respectively, so as to face the front. No seats 1 or attachments 76 are attached to the mounting regions 70C and 70D on the left side and the right side of the middle row. In the fourth layout, the occupants face the center of the vehicle 72 and face one another, and this is suitable for conversations and meetings.

FIG. 14 shows a fifth layout of the passenger compartment 75. In the fifth layout, seats 1 are mounted in the mounting regions 70A, 70C, 70E on the left side of the front row, the left side of the middle row, and the left side of the rear row, respectively, so that the seats 1 all face forward, and an attachment 76 is attached to the mounting regions 70B, 70D and 70F on the right side of the front row, the right side of the middle row, and the right side of the rear row, respectively. The attachment 76 extends in the fore and aft direction, from the mounting region 70B on the right side of the front row to the mounting region 70F on the right side of the rear row. The attachment 76 may be provided with coupling device 8 that are configured to couple to the strikers 11 of the mounting regions 70B, 70D, and 70F on the right side of the front row, the right side of the middle row, and the right side of the rear row. The attachment 76 may include, for example, a table, a shelf, or a storage box. In the fifth layout, a large attachment 76 can be used.

FIG. 15 shows a sixth layout of the passenger compartment 75. In the sixth layout, the spacing between the left side mounting regions 70A, 70C, 70E and the right side mounting regions 70B, 70D, 70F is set to be equal to the length of one side of the mounting regions 70A to 70F. Further, the spacing between the front row mounting regions 70A and 70B and the middle row mounting regions 70C and 70D, the spacing between the middle row mounting regions 70C and 70D and the rear row mounting regions 70E and 70F are set to be equal to the length of one side of the mounting regions 70A to 70F. A front intermediate mounting region 70G is created by the rear right striker 11 of the mounting region 70A on the left side of the front row, the rear left striker 11 of the mounting region 70B on the right side of the front row, the front right striker 11 of the mounting region 70C on the left side of the middle row, and the front left striker 11 of the mounting region 70D on the right side of the row. Further, a rear intermediate mounting region 70H is created by the rear right striker 11 of the mounting region 70C on the left side of the middle row, the rear left striker 11 on of the mounting region 70D on the right side of the middle row, the front right striker 11 of the mounting region 70E on the left side of the rear row, and the front left striker 11 of the mounting region 70F on the right side of the rear row. A seat 1 is attached to each of the front intermediate mounting region 70G and the rear intermediate mounting region 70H so as to face forward. Further, the seat 1 attached to the rear intermediate mounting region 70H may face rearward. In the sixth layout, the seats 1 thus can be arranged in the laterally central part of the vehicle 72.

As described above, the user can freely select the position and orientation of the seats 1 with respect to the floor 9 of the vehicle 72. In addition, the user can arrange the attachments 76 on the floor 9 as needed.

As shown in FIG. 16, at least one of the seat cushion 2 and the seat back 3 is provided with an light pipe 101 placed on the skin material 5. As shown in FIGS. 17 and 18, the light pipe 101 includes an elongated light guide 102 and a sheath 103 that covers the light guide 102. The light guide 102 consists of an optical fiber and is made of a light-transmitting material such as polycarbonate. The sheath 103 is made of a transparent or translucent material. The sheath 103 is provided with a tab 104 which is interposed between the pad 105 and the skin material 5, and sewn or adhered to the back surface of the skin material 5. Preferably, the light pipe 101 is provided at the seam of the skin material 5 and is exposed to the outside of the skin material 5. In other words, two pieces of skin material 5 are joined to each other via the light pipe 101.

As shown in FIG. 16, the light pipe 101 may be positioned in the seat 1 so as not to contact the seated occupant and not to receive a load from the seated occupant. Specifically, the light pipe 101 may be positioned away from the thighs, hips, and shoulders of the seated occupant. The light pipe 101 provided on the seat cushion 2 may extend, for example, along the right front edge, the right side edge, the rear edge, the left side edge, and the left front edge of the seat surface (upper surface) 2A of the seat cushion 2. Further, the light pipe 101 provided in the seat back 3 may extend, for example, along the right side edge, the upper edge, and the left side edge of the support surface (front surface) 3A of the seat back 3.

The light guide 102 and the sheath 103 may be, for example, black in color. As a result, when the light pipe 101 is not emitting light, the light pipe 101 becomes inconspicuous. However, the light guide 102 and the sheath 103 may have any other color.

As shown in FIGS. 16 and 17, a light generator 106 is connected to an end of the light pipe 101. The light generator 106 includes a housing 107 connected to one end of the light pipe 101, a light source 108 placed in the housing 107 to irradiate light onto the one end of the light guide 102, and a light control device 110 provided in the housing 107 for controlling the light emitting state of the light source 108. Such a light generator 106 may be placed inside each of the seat cushion 2 and the seat back 3. The light source 108 may consist of an LED, or a combination of a plurality of LEDs 108A and 108B having different emission colors. The light emitted from the light source 108 is inputted to the end part of the light guide 102 and emitted to the outside from the side surface of the light guide 102 through the sheath 103. As a result, the light pipe 101 emits light as a whole. The light control device 110 may change the emission color of the light pipe 101 by selecting the LEDs 108A and 108B that are turned on.

The light control device 110 may be configured to control the light source 108 according to a signal from another electric device provided on the seat 1. As shown in FIG. 19, such an electric device may include, for example, a power receiving coil 112, a load sensor 113, a seat heater 114, a seat blower 115, a seatbelt buckle sensor 116, and a biometric information sensor 117.

The power receiving coil 112 is connected to an onboard battery, and supplies the electric power received from a power transmitting coil 121 provided in the mounting region 70 of the floor 9 by electromagnetic induction to the light generator 106 and other electric devices. The power receiving coil 112 starts receiving electric power from the power transmitting coil 121 when the seat 1 is placed in the corresponding mounting region. The light control device 110 may be configured to cause the light source 108 to emit light when electric power is received from the power receiving coil 112. Thereby, the user can know that the seat 1 is placed in the corresponding mounting region 70 based on the light emitting state of the light pipe 101. The light control device 110 may first cause the first LED 108A having a first emission color to emit light, and after elapsing of a predetermined time period, cause the second LED 108B having a second emission color to emit light in place of the first LED 108A. When switching the light sources 108, the light control device 110 may gradually reduce the illuminance of the first LED 108A and gradually increase the illuminance of the second LED 108B at the same time.

Further, the light control device 110 is configured to determine if the seat 1 is correctly mounted in the mounting region 70 according to the voltage or current supplied from the power receiving coil 112, and if the seat 1 is not correctly mounted in the mounting region 70, the mode of emitting light from the light source 108 may be changed. For example, the light control device 110 may determine that the seat 1 is not correctly mounted in the mounting region 70 when the voltage supplied from the power receiving coil 112 is less than a predetermined threshold value. The light control device 110 may blink the light source 108 or alternate the emission color of the light source 108 when the seat 1 is not correctly mounted in the mounting region 70. Thereby, the user can visually recognize if the seat 1 is correctly mounted in the mounting region 70 from the light emitting state of the light pipe 101.

The load sensor 113 is provided on at least one of the upper surface of the seat cushion 2 and the front surface of the seat back 3, and detects an object placed on the seat 1. The load sensor 113 may be, for example, a membrane switch or a piezoelectric device. The load sensor 113 may be positioned between the pad of the seat cushion 2 and the skin material 5. The light control device 110 may control the light source 108 according to the signal from the load sensor 113. The light control device 110 may, for example, emit light from the light source 108 for a predetermined time period after the membrane switch is loaded, and switched from off to on. Further, for example, the light control device 110 may cause the light source 108 to emit light for a predetermined time period after the load applied to the membrane switch is lost and the membrane switch is switched from on to off. Further, the light control device 110 may change the LED 108A, 108B that emits light when the state of the membrane switch changes between on and off. For example, when the membrane switch is off, the light control device 110 emits light from the first LED 108A, and when the membrane switch is switched from off to on, the light control device 110 may gradually reduce the illuminance of the first LED 108A and gradually increase the illuminance of the second LED 108B. The commercial value of the seat 1 can be improved by changing the light emitting mode of the light pipe 101 when the occupant is seated in the seat 1.

The seatbelt buckle sensor 116 detects the state of engagement between the seatbelt buckle and the tongue, and outputs an on signal when the buckle and tongue are engaged and an off signal when the buckle and tongue are disengaged. The light control device 110 may control the light emitting state of the light source 108 according to the signal from the seatbelt buckle sensor 116. Thus, the user can visually recognize that the seatbelt is fastened or not according to the light emitting state of the light pipe 101.

The seat beater 114 includes a sheet material formed of a non-woven fabric or the like, a heating wire provided on the sheet material, and a heater switch for connecting the heating wire with the power receiving coil 112. The heater switch cuts off the power supply from the power receiving coil 112 to the heating wire when it is in the off state, and enables the power supply from the power receiving coil 112 to the heating wire when it is in the on state. The light control device 110 is connected to the heater switch so as to detect the state of the heater switch. The light control device 110 may control the light emitting state of the light source 108 according to the state of the heater switch. For example, the light control device 110 may cause the first LED 108A to emit light when the heater switch is on, and may cause the second LED 108B to emit light when the heater switch is off. Further, the light control device 110 may gradually increase the illuminance of the second LED 108B while gradually reducing the illuminance of the first LED 108A according the switching of the heater switch. Thereby, the user can visually recognize the operating state of the seat heater 114 according to the light emitting state of the light pipe 101.

The seat blower 115 includes a blower fan provided inside at least one of the seat cushion 2 and the seat back 3, and a blower switch for connecting the blower to the power receiving coil 112. The blower switch cuts off the power supply from the power receiving coil 112 to the blower when it is in the off state, and enables the power supply from the power receiving coil 112 to the blower when it is in the on state. The blower fan is, for example, an axial fan, and blows air toward the upper surface of the seat cushion 2 or the front surface of the seat back 3.

The light control device 110 is connected to the blower switch and detects the state of the blower switch. The light control device 110 may control the light emitting state of the light source 108 according to the state of the blower switch. For example, the light control device 110 may cause the first LED 108A to emit light when the blower switch is on, and may cause the second LED 108B to emit light when the blower switch is off. Further, the light control device 110 may gradually increase the illuminance of the second LED 108B while gradually reducing the illuminance of the first LED 108A in response to the switching of the blower switch. Thereby, the user can visually recognize the operating state of the seat blower 115 based on the light emitting state of the light pipe 101.

The biometric information sensor 117 may include, for example, at least one of a pulse sensor, a temperature sensor, a respiration sensor, and a humidity sensor. The biometric information sensor 117 is provided on at least one of the seat cushion 2 and the seat back 3, and acquires biological information including at least one of the pulse, body temperature, respiratory rate, and sweating state of the occupant seated on the seat 1. The biometric information sensor 117 is connected to the light control device 110 and outputs biometric information to the light control device 110. The light control device 110 controls the light emitting state of the light source 108 based on the biological information. The light control device 110 determines, for example, if the pulse rate is within a predetermined determination range, and changes the mode of emitting light from the light source 108 depending on if the pulse rate is within the determination range or outside the determination range. Thus, the seated occupant or a person around the seat 1 can visually recognize the state of the seated occupant according to the light emitting state of the light pipe 101.

The light control device 110 may be connected to the seat control device 119 provided on the seat 1 so as to control the light emitting state of the light source 108 according to the communication state between the seat control device 119 and a user terminal 123. The seat control device 119 may be connected to the user terminal 123 by, for example, short-range wireless communication or wired communication using a cable. The user terminal 123 may be a smartphone or the like. The seat control device 119 may control the activation, deactivation, and output intensity of the seat heater 114, the seat blower 115, or the like according to the command signal from the user terminal 123. The seat control device 119 outputs a signal indicating the communication state with the user terminal 123 to the light control device 110. The light control device 110 detects the communication state between the seat control device 119 and the user terminal 123 according to the signal from the seat control device 119. For example, the light control device 110 causes the first LED 108A to emit light when communication between the seat control device 119 and the user terminal 123 is established, and causes the second LED 108B to emit light when communication between the seat control device 119 and the user terminal 123 is disconnected. Thereby, the user can visually recognize the communication state between the seat control device 119 and the user terminal 123 according to the light emitting state of the light pipe 101.

The headrest 12 may be provided a seat 130 as shown in FIGS. 20 and 21. As shown in FIG. 20, the seat 130 has a seat back 131 rotatably coupled to the floor 9 and a seat cushion 132 rotatably coupled to the seat back 131. A lower end part of the seat back 131 is provided with a stay 134 that is rotatably connected to the floor 9 about a laterally extending axis. The seat back 131 rotates between an upright position and a collapsed in which the seat back 131 falls forward substantially parallel to the floor 9. A rear end part of the seat cushion 132 is provided with an arm 135 that is rotatably connected to the seat back 131 about a laterally extending axis. The seat cushion 132 can rotate between a use position in which the seat cushion 132 is positioned substantially perpendicular to the seat back 131 and a tip-up position in which the upper surface (seat surface 2A) of the seat cushion 132 is placed against the front surface of the seat back 131. When the seat cushion 132 is in the tip-up position with respect to the seat back 131, the seat back 131 can be rotated to the collapsed position.

As shown in FIG. 21, a rotatable leg member 137 is provided on the lower surface of the seat cushion 132. The leg member 137 includes a left and a right vertical portion 137A extending in parallel to each other in a spaced apart relationship, and a horizontal portion 137B connecting the corresponding ends of the left and right vertical portions 137A. The left and right vertical portions 137A and the horizontal portion 137B may be formed, for example, by bending a continuous pipe stock. The left and right vertical portions 137A are rotatably connected to the lower surface of the seat cushion 132 at the base ends 137C thereof (which are on the end portions thereof on the opposite of the horizontal portion 137B) about a laterally extending axis. The leg member 137 can rotate between a use position in which the leg member 137 projects substantially perpendicularly from the lower surface of the seat cushion 132, and a storage position in which the leg member 137 extends closely along the lower surface of the seat cushion 132. When the seat cushion 132 is in the tip-up position and the leg member 137 is in the storage position, the base ends 137C of the vertical portions 137A are located above the horizontal portion 137B. When the seat cushion 132 is in the use position and the leg member 137 is in the use position, the leg member 137 abuts against the floor 9 at the horizontal portion 137B. As a result, the seat cushion 132 is supported by the floor 9 via the leg member 137.

A storage pocket 140 is fitted to the left and right vertical portions 137A of the leg member 137. The storage pocket 140 includes a left and a right joint portion 141 attached to the left and right vertical portions 137A, respectively, and a bag portion 142 that extends laterally, and is connected to the left and right joint portions 141 at the respective side ends thereof. The left and right joint portions 141 and the bag portion 142 extend along the vertical portion 137A. The left and right joint portions 141 are each shaped as a sleeve, and receive the corresponding vertical portions 137A therein. The left and right joint portions 141 may each consist of a sheet material 141A and a pair of connecting members 141B provided on the opposite edges of the sheet material 141A. The connecting member 141B may be, for example, a hook-and-loop fastener, a zipper, or buttons. Each joint portion 141 may be attached to the corresponding vertical portion 137A by winding the sheet material 141A around the vertical portion 137A and then joining the opposing connecting members 141B. The bag portion 142 has an opening on the side of the base ends of the vertical portions 137A, and has a depth toward the side of the horizontal portion 137B. The bag portion 142 may be formed of a sheet material such as a woven fabric or a mesh material. The user can use the storage pocket 140 as an accessory case. When the seat cushion 132 is in the use position and the leg member 137 is in the use position, the opening of the bag portion 142 faces vertically upward. Further, when the seat cushion 132 is in the tip-up position and the leg member 137 is in the storage position, the opening of the bag portion 142 faces vertically upward. Therefore, the article stored in the bag portion 142 is prevented from falling off from the bag portion 142.

On the lower surface of the seat cushion 132, a lighting device 144 is provided between the left and right vertical portions 137A. The lighting device 144 may be, for example, an LED. The lighting device 144 may be provided on the lower surface of the seat cushion 132 between the base ends of the left and right vertical portions 137A. The lighting device 144 illuminates the storage pocket 140 so that the user can check the contents of the storage pocket 140 with ease.

A headrest 12 may be provided on a bench seat 150 as shown in FIG. 22. The bench seat 150 has a seat cushion 151 coupled to the floor 9 and a seat back 152 extending upward from a rear part of the seat cushion 151. A laterally central part of the seat back 152 is provided with an armrest accommodating recess 153 that is recessed rearward. An armrest 155 is rotatably supported at a lower part of a left and a right side wall portion defining the armrest accommodating recess 153. The armrest 155 rotates between a storage position accommodated in the armrest accommodating recess 153 and a use position protruding forward from the armrest accommodating recess 153. A connector module 157 is provided on the bottom surface of the armrest accommodating recess 153. The connector module 157 is positioned on the bottom surface of the armrest accommodating recess 153 so as to be above the upper surface of the armrest 155 in the use position.

As shown in FIG. 23, the connector module 157 has at least one power supply port 157B provided in a main body portion 157A. The power supply port 157B may be, for example, a USB port. Further, the connector module 157 may have a lighting device 157C in the main body portion 157A. The lighting device 157C may be, for example, an LED. The power supply port 157B and the lighting device 157C are connected to an onboard battery. Further, the connector module 157 may be provided with a lid 157D that selectively covers the power supply port 157B and the lighting device 157C. The lid 157D may be connected to the main body portion 157A by a hinge or the like. The lighting device 157C may be configured to emit light only when the lid 157D is open. For example, when the lid 157D is in the closed position, the switch 157E is pressed so that the power supply to the lighting device 157C may be cut off.

Although the description of the specific embodiment is completed above, the present invention can be widely modified without being limited by the above described embodiments.

LIST OF REFERENCE NUMERALS

| | |
|---|---|
| 1: seat | 2: seat cushion |
| 3: seat back | 12: headrest |
| 13: pillar member | 13A: vertical axis |
| 13B: curved section | 13C: first horizontal axis |
| 13D: second horizontal axis | 14: base member |
| 14A: base vertical portion | 14B: base upper portion |
| 15: connecting member | 15A: engaging portion |
| 15B: first fastening portion | 15C: second fastening portion |
| 16: pad | 16A: pad vertical portion |
| 16B: pad upper portion | 17: skin material |
| 21: first hole | 22: fastening member |
| 22A: bolt | 22B: nut |
| 24: base hole | 26: first bulging portion |
| 26A: recess | 27: second bulging portion |
| 28: third bulging portion | 29: reinforcing rib |
| 31: groove portion | 32: edge wall portion |
| 40: headrest | 41: pillar member |
| 41A: vertical shaft | 41B: curved section |
| 41C: first horizontal shaft | 41D: second horizontal axis |
| 41E: third horizontal axis | 42: base member |
| 42A: base vertical portion | 42B: base upper portion |

-continued

LIST OF REFERENCE NUMERALS

| | |
|---|---|
| 42C: curved surface portion | 43: connecting member |
| 43A: engaging portion | 43B: First fastening portion |
| 43C: second fastening portion | |

The invention claimed is:

1. A headrest for a vehicle seat, comprising:
a pillar member including a right and a left vertical shaft extending upward from an upper part of a seat back, a right and a left first horizontal shaft extending forward from upper ends of the respective vertical shafts, each first horizontal shaft including a curved section, and a second horizontal shaft extending laterally between front parts of the first horizontal shafts;
a base member including a base vertical portion extending vertically ahead of the vertical shafts, a base upper portion extending rearward from an upper end of the base vertical portion, and a right and a left first hole formed in the base upper portion to have the respective curved sections or the respective vertical shafts passed therethrough;
a connecting member pivotably connecting the base upper portion to the second horizontal shaft; and
a pad supported by the base member,
wherein the first holes each consist of an elongated hole extending in a fore and aft direction, and at least one of a front end and a rear end of the first hole is formed in a substantially triangular shape.

2. The headrest according to claim 1, wherein the connecting member includes a channel shaped engaging portion pivotably receiving the second horizontal shaft, and a first fastening portion extending from a side edge of the engaging portion and fastened to the base upper portion via a fastening member and positioned behind the second horizontal shaft.

3. The headrest according to claim 2, wherein the engaging portion has a semicircular cross section which is open rearward.

4. The headrest according to claim 2, wherein the connecting member is provided with a second fastening portion extending from another side edge of the engaging portion,
a part of the base member located at a boundary between the base upper portion and the base vertical portion is provided with a base hole which is passed through the base member,
the second horizontal shaft is located at a boundary between the base upper portion and the base vertical portion,
the first fastening portion is located on an upper surface of the base upper portion,
the second fastening portion is passed through the base hole and positioned on a lower surface of the base upper portion, and
the fastening member includes a bolt passed through the first fastening portion, the base upper portion and the second fastening portion, and a nut threadably engaging the bolt.

5. The headrest according to claim 4, wherein the nut is welded to the second fastening portion.

6. The headrest according to claim 4, wherein the engaging portion protrudes from a head of the bolt in an axial direction of the bolt.

7. The headrest according to claim 6, wherein the pad is in contact with the first fastening portion between the engaging portion and the head of the bolt.

8. The headrest according to claim 1, wherein an upper part of the base vertical portion is provided with a first bulging portion bulging more away from the base upper portion than the second horizontal shaft.

9. The headrest according to claim 8, wherein a part of the first bulging portion on a side of the second horizontal shaft is formed with a recess receiving a part of the connecting member.

10. The headrest according to claim 8, wherein the first bulging portion is positioned between the left and right vertical shafts in front view.

11. The headrest according to claim 8, wherein the base vertical portion is provided with at least one second bulging portion that bulges forward and extends downward from the first bulging portion.

12. The headrest according to claim 11, wherein the base vertical portion is provided with a third bulging portion that bulges forward and extends along an edge of the base vertical portion, and the second bulging portion and the third bulging portion are connected to each other.

13. The headrest according to claim 12, wherein a plurality of reinforcing ribs extending in a direction orthogonal to a lengthwise direction are provided on rear surfaces of the second bulging portion and the third bulging portion.

14. The headrest according to claim 1, wherein the base upper portion is provided with a right and a left groove which are recessed downward and extend in a fore and aft direction, the first holes being formed at rear end parts of the respective grooves.

15. The headrest according to claim 1, wherein the second horizontal shaft is interposed between the connecting member and the base member.

16. A vehicle seat provided with the headrest according to claim 1.

17. A headrest for a vehicle seat, comprising:
a pillar member including a right and a left vertical shaft extending upward from an upper part of a seat back, a right and a left first horizontal shaft extending forward from upper ends of the respective vertical shafts, each first horizontal shaft including a curved section, and a second horizontal shaft extending laterally between front parts of the first horizontal shafts;
a base member including a base vertical portion extending vertically ahead of the vertical shafts, a base upper portion extending rearward from an upper end of the base vertical portion, and a right and a left first hole formed in the base upper portion to have the respective curved sections or the respective vertical shafts passed therethrough;
a connecting member pivotably connecting the base upper portion to the second horizontal shaft; and
a pad supported by the base member,
wherein the pillar member includes a third shaft that extends laterally ahead of the second horizontal shaft and is connected to front ends of the first horizontal shafts.

18. The headrest according to claim 17, wherein a front end of the first horizontal shafts or the third horizontal shaft abuts against a front surface of the base vertical portion so as to restrict an angular position of the base member with respect to the second horizontal shaft.

19. A method of making a headrest for a vehicle seat, comprising:
preparing a pillar member including a right and a left vertical shaft extending upward from an upper part of a seat back, a right and a left first horizontal shaft extending forward from upper ends of the respective vertical shafts, each first horizontal shaft including a curved section, and a second horizontal shaft extending laterally between front parts of the first horizontal shafts;
preparing a base member including a base vertical portion extending vertically ahead of the vertical shafts, a base upper portion extending rearward from an upper end of the base vertical portion, and a right and a left first hole formed in the base upper portion to have the respective curved sections or the respective vertical shafts passed therethrough;
pivotably connecting the base upper portion to the second horizontal shaft by a connecting member; and
supporting a pad on the base member,
wherein the first holes each consist of an elongated hole extending in a fore and aft direction, and at least one of a front end and a rear end of the first hole is formed in a substantially triangular shape.

\* \* \* \* \*